US012306459B2

(12) United States Patent
Suzuki et al.

(10) Patent No.: US 12,306,459 B2
(45) Date of Patent: May 20, 2025

(54) LENS DRIVING DEVICE AND CAMERA MODULE

(71) Applicant: ALPS ALPINE CO., LTD., Tokyo (JP)

(72) Inventors: Katsutoshi Suzuki, Fukushima (JP); Kiyoyuki Ito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 189 days.

(21) Appl. No.: 18/343,070

(22) Filed: Jun. 28, 2023

(65) Prior Publication Data

US 2023/0341651 A1 Oct. 26, 2023

Related U.S. Application Data

(63) Continuation of application No. PCT/JP2022/002338, filed on Jan. 24, 2022.

(30) Foreign Application Priority Data

Jan. 26, 2021 (JP) ................ 2021-010631

(51) Int. Cl.
  *G02B 7/09* (2021.01)
  *G03B 5/04* (2021.01)
  *G03B 5/06* (2021.01)
(52) U.S. Cl.
  CPC ............. *G02B 7/09* (2013.01); *G03B 5/04* (2013.01); *G03B 5/06* (2013.01); *G03B 2205/0061* (2013.01)
(58) Field of Classification Search
  CPC ... G02B 7/09; G02B 7/08; G02B 7/04; G03B 5/04; G03B 5/06; G03B 2205/0061; G03B 17/02; G03B 30/00
  See application file for complete search history.

(56) References Cited

U.S. PATENT DOCUMENTS

2010/0091392 A1 4/2010 Jung et al.
2012/0099212 A1\* 4/2012 Wu .................. H04N 23/55
  359/824
(Continued)

FOREIGN PATENT DOCUMENTS

JP 2006-106798 4/2006
JP 2010-097216 4/2010
(Continued)

OTHER PUBLICATIONS

International Search Report for PCT/JP2022/002338 mailed on Mar. 15, 2022.

*Primary Examiner* — Mekonnen D Dagnew
(74) *Attorney, Agent, or Firm* — IPUSA, PLLC

(57) ABSTRACT

A lens driving device includes: a fixed member; a lens-retaining member; a guide mechanism; a piezoelectric driving portion; and a pressing member. The lens-retaining member, the guide mechanism, the piezoelectric driving portion, and the pressing member are each configured as described in the specification. The pressing member is formed of a leaf spring member. The pressing member includes: a fixed portion to be fixed to the fixed member; a support portion configured to support the piezoelectric driving portion; and an elastically deformable portion that is provided between the fixed portion and the support portion and is elastically deformable. The support portion includes a plate-shaped base portion that is continuous with the elastically deformable portion, and a folded portion that is folded from the base portion in an L shape and projects toward the lens-retaining member. The piezoelectric driving portion is fixed to the folded portion.

12 Claims, 38 Drawing Sheets

(56) References Cited

U.S. PATENT DOCUMENTS

| | | | |
|---|---|---|---|
| 2016/0241788 A1* | 8/2016 | Moriya | G03B 5/00 |
| 2023/0071120 A1* | 3/2023 | Suzuki | G02B 7/09 |

FOREIGN PATENT DOCUMENTS

| | | |
|---|---|---|
| JP | 2013-195701 | 9/2013 |
| JP | 2013-250297 | 12/2013 |

* cited by examiner

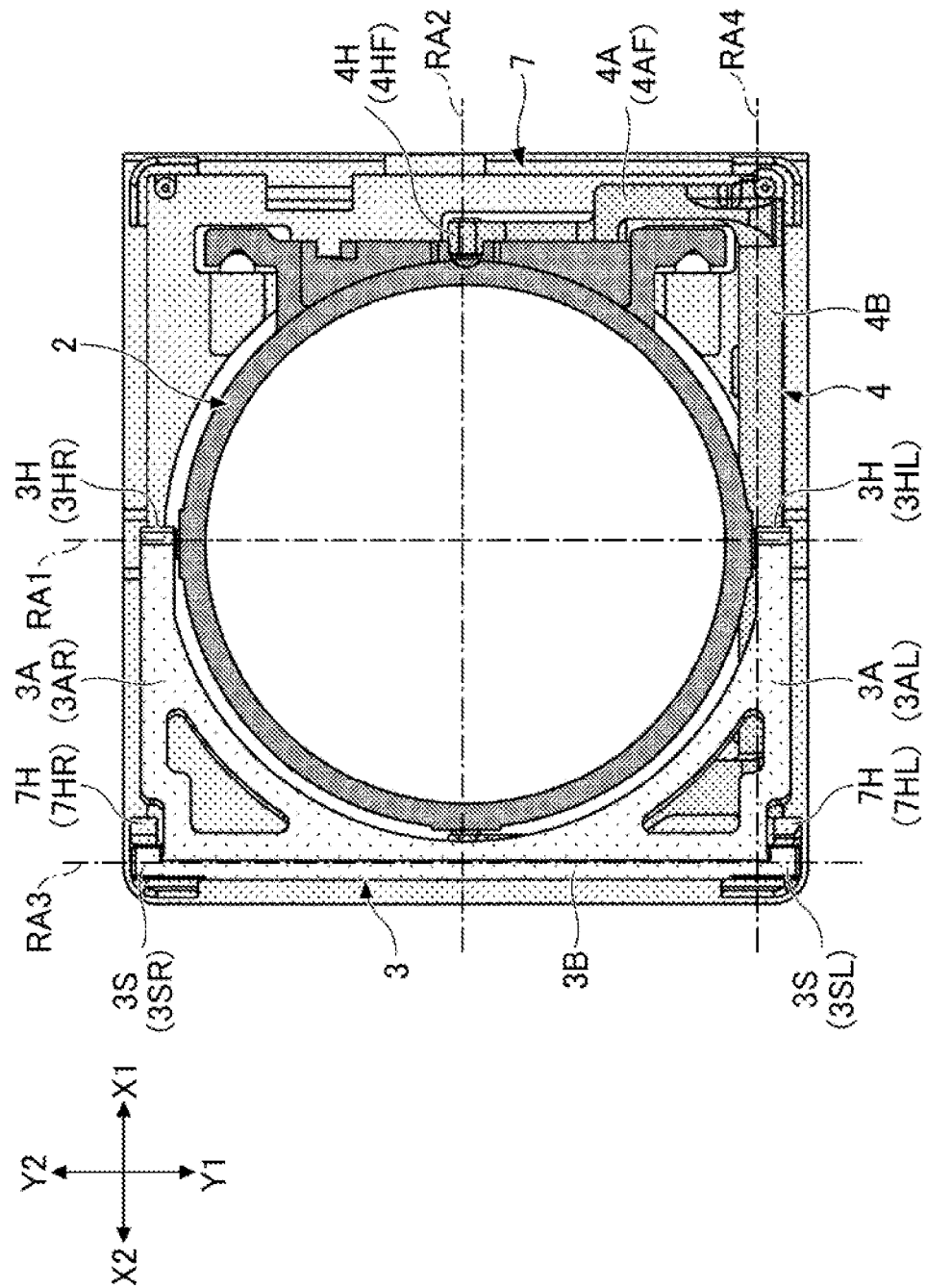

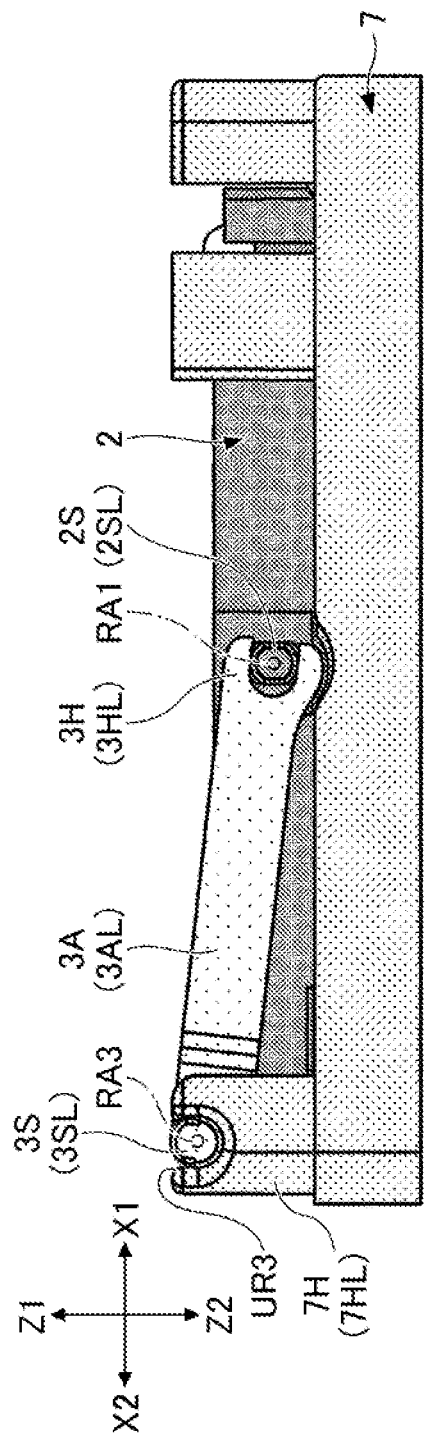

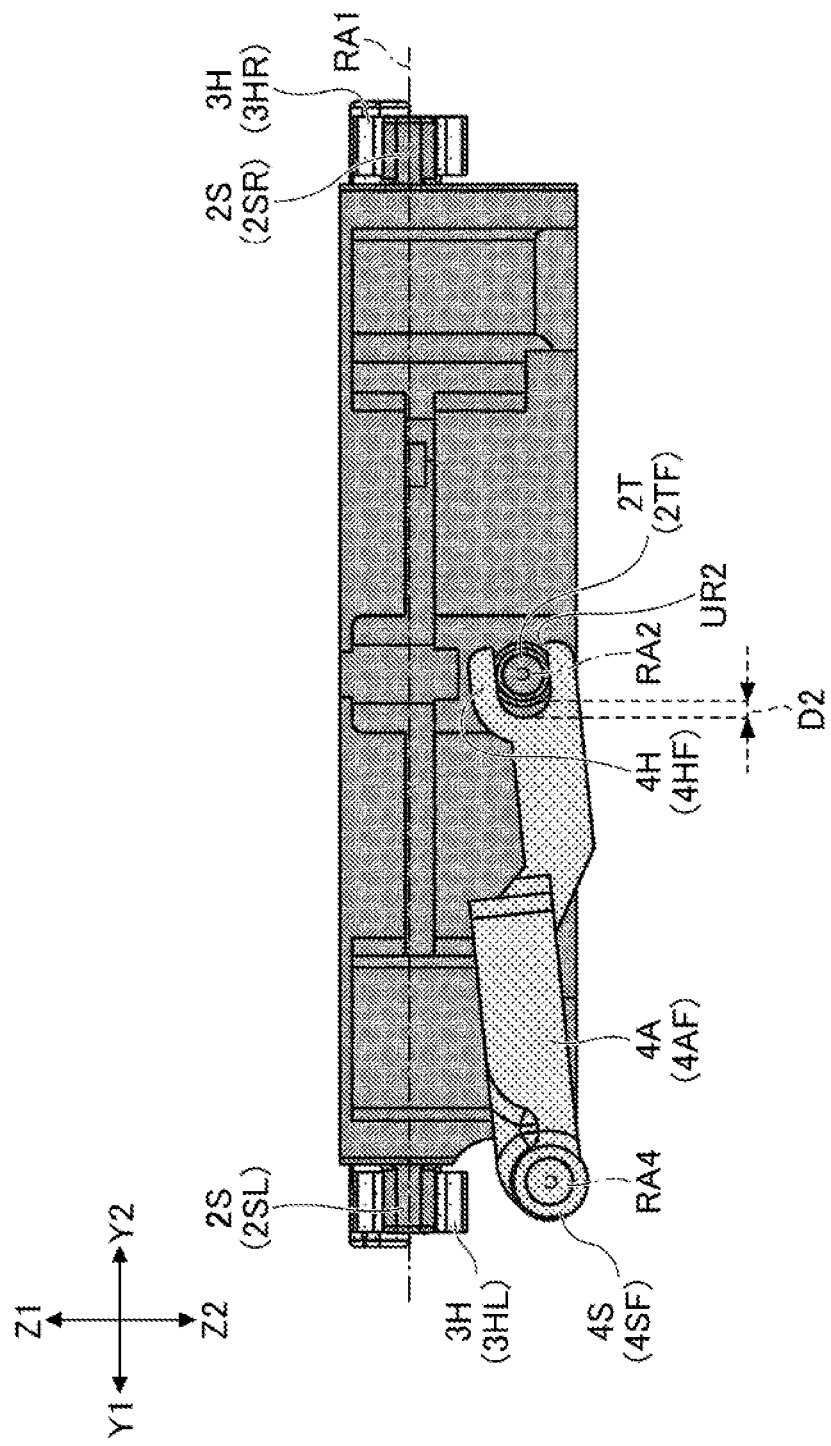

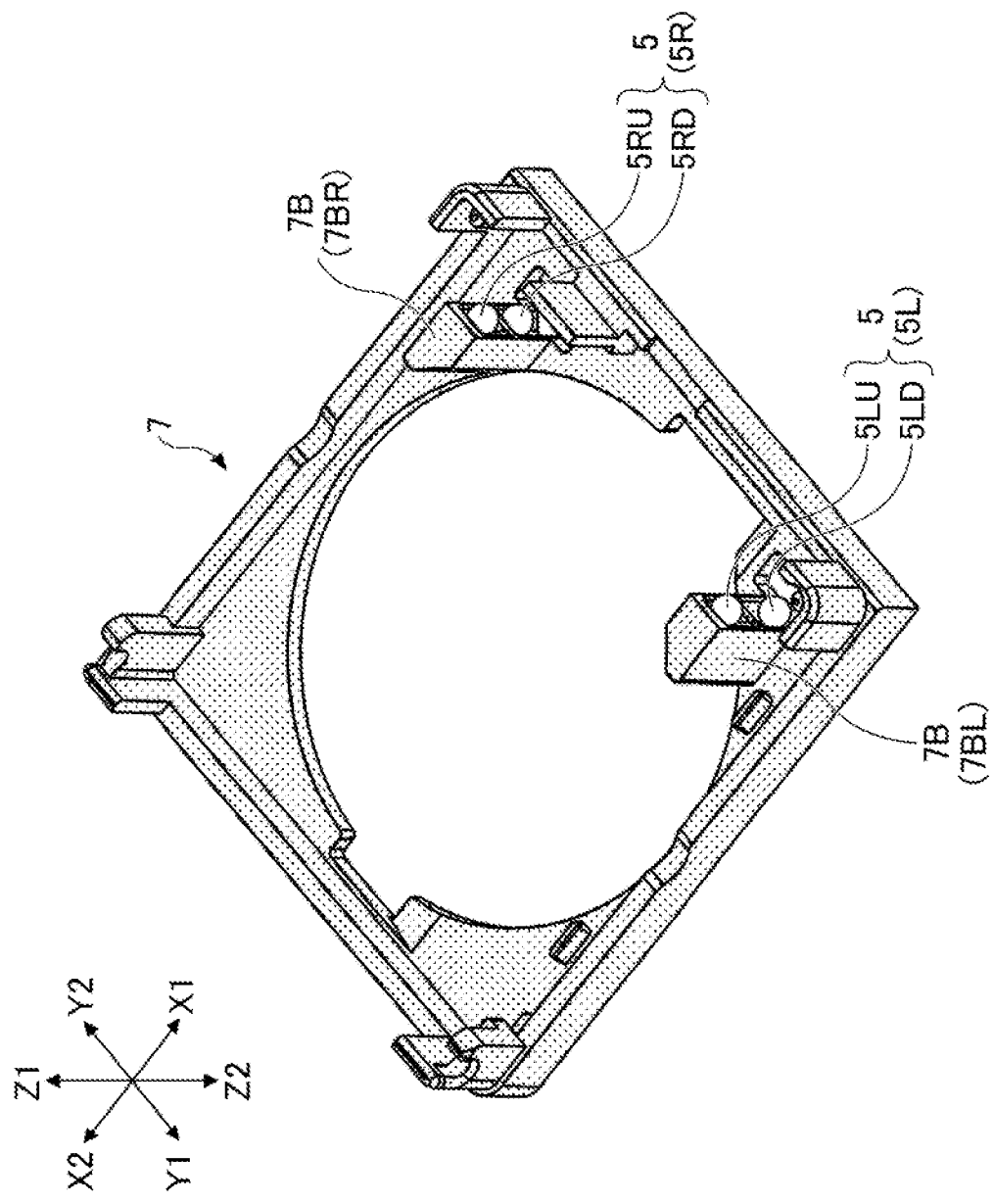

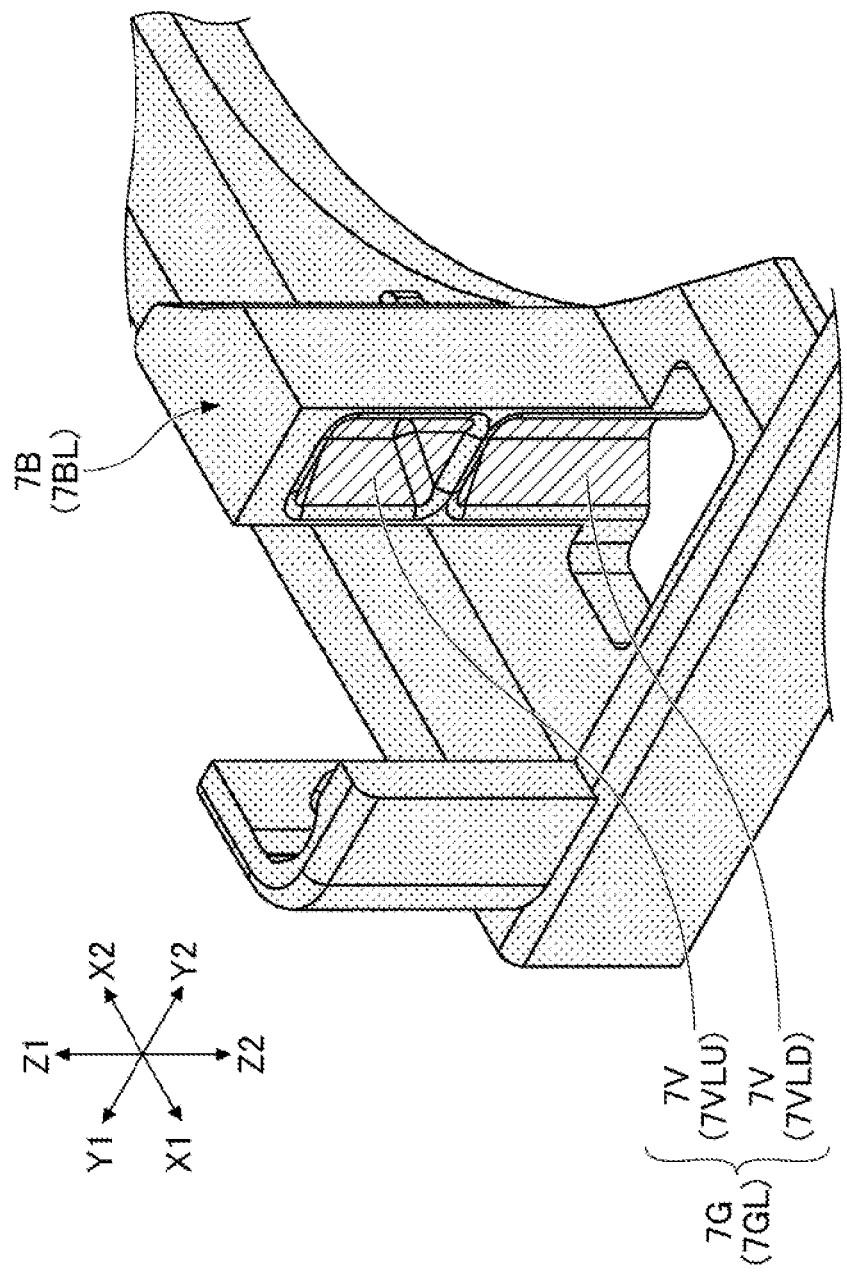

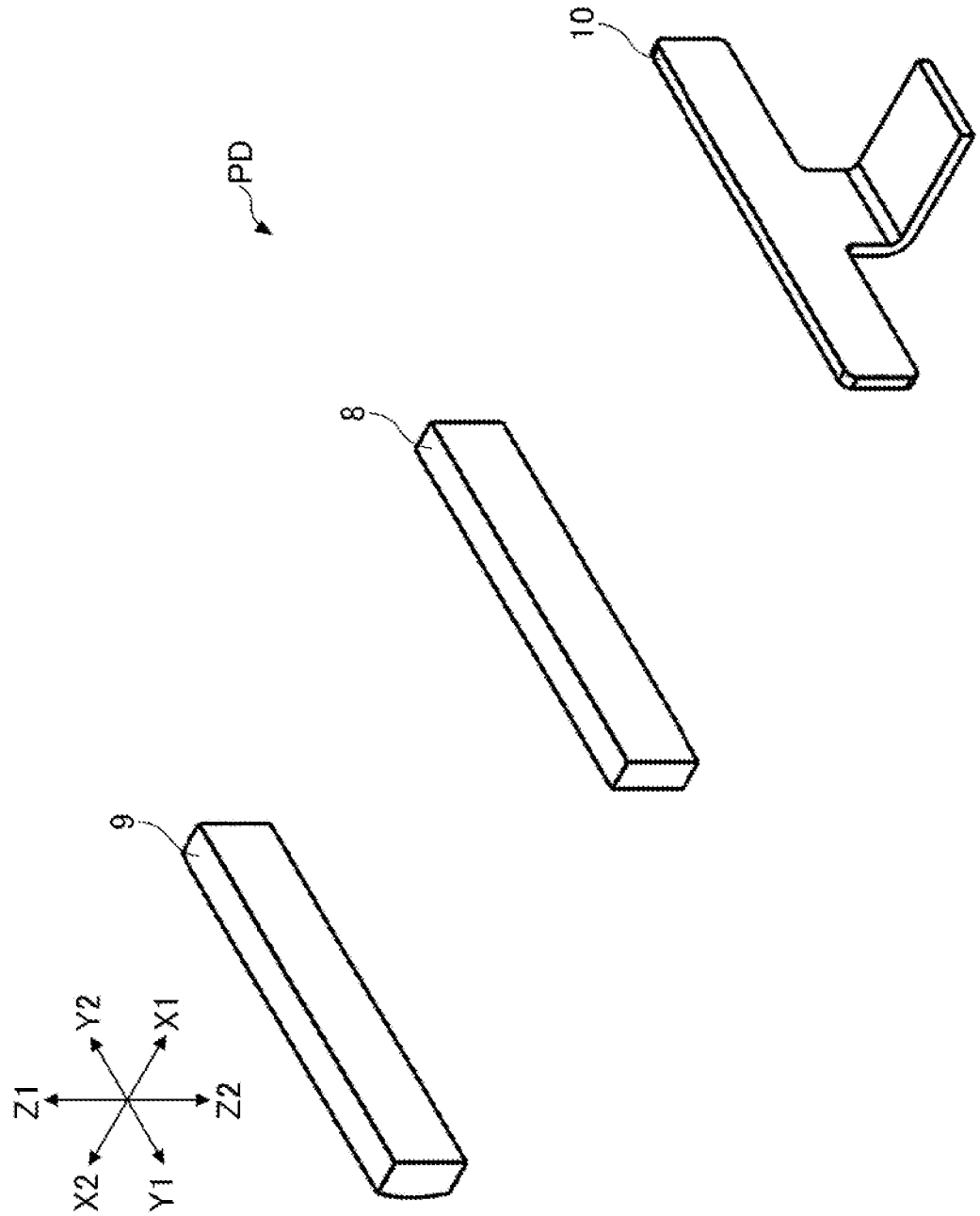

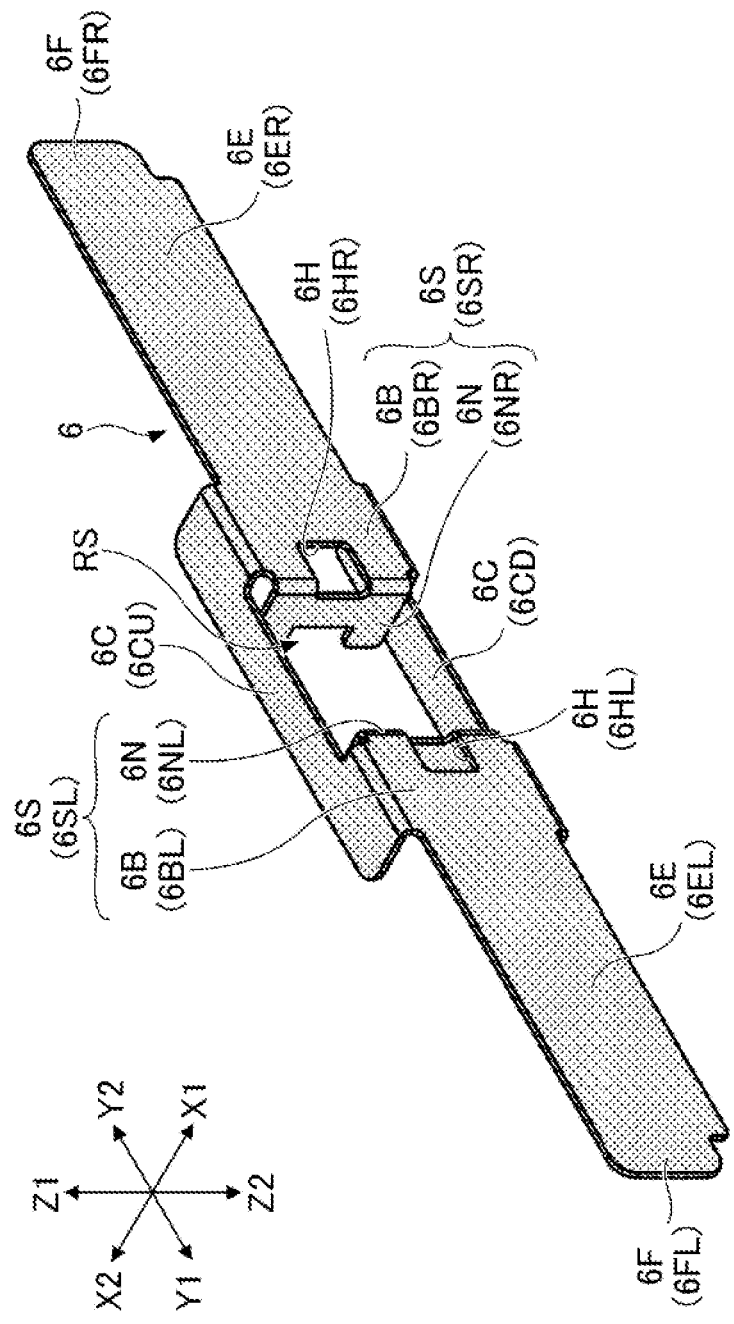

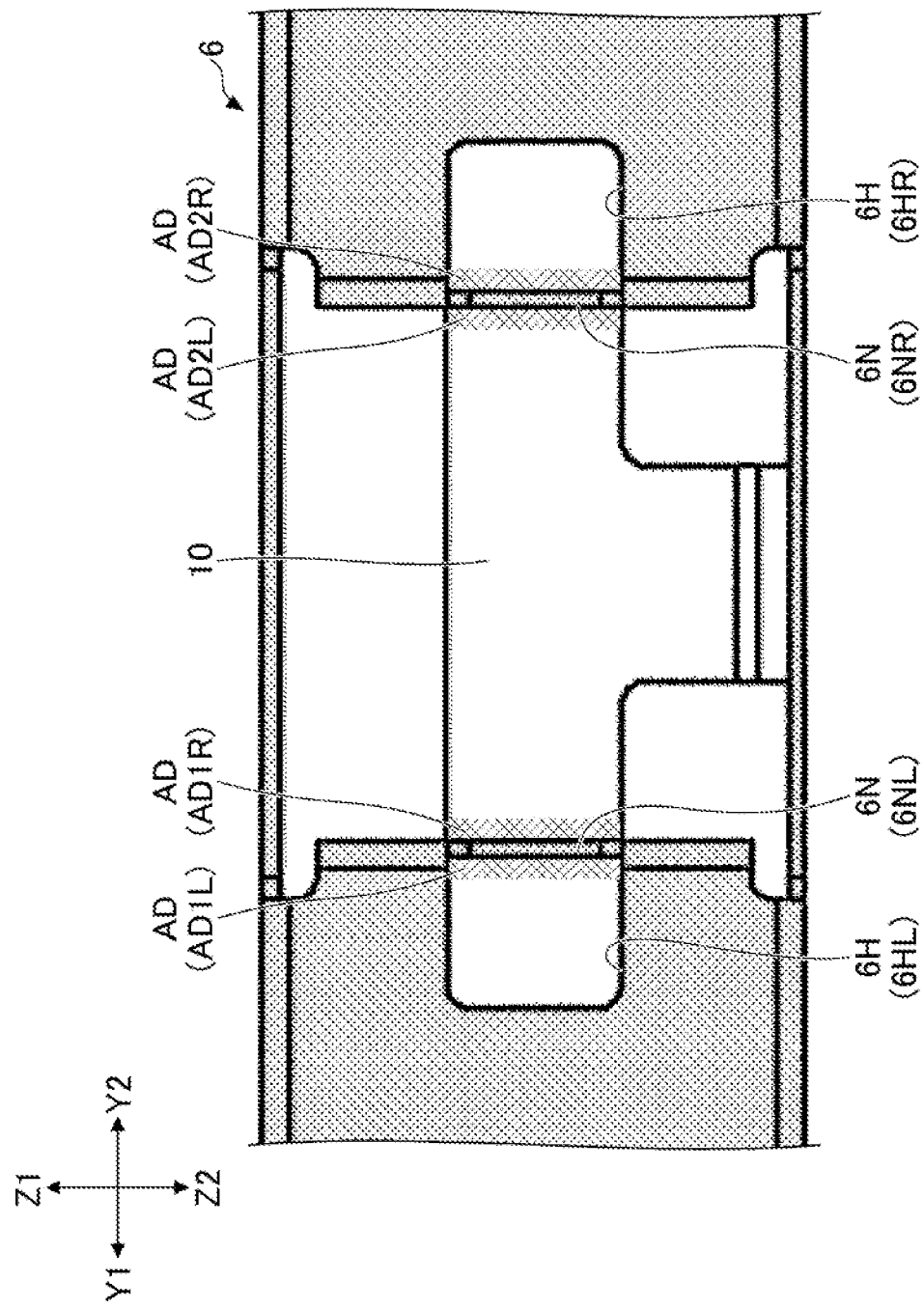

LENS DRIVING DEVICE AND CAMERA MODULE

CROSS-REFERENCE TO RELATED APPLICATION

This application is a continuation application of International Application No. PCT/JP2022/002338 filed on Jan. 24, 2022, and designated the U.S., which is based upon and claims priority to Japanese Patent Application No. 2021-010631, filed on Jan. 26, 2021, the entire contents of which are incorporated herein by reference.

BACKGROUND

1. Field of the Invention

The present disclosure relates to a lens driving device mounted in, for example, portable devices with cameras.

2. Description of the Related Art

Some lens driving units (lens driving devices) are able to move a lens carrier (lens-retaining member) relative to a module base (base member) in an optical-axis direction through frictional driving utilizing a bending motion of a piezoelectric element (see, for example, Patent Document 1). In these devices, a coil spring is utilized for pressing the piezoelectric element against the lens-retaining member.

CITATION LIST

Patent Document

Patent Document 1: Japanese Laid-Open Patent Publication No. 2010-097216

In the above-described configuration, however, a plurality of coil springs is disposed, resulting in a complicated structure.

In view thereof, it is desirable to provide a lens driving device that is able to press a piezoelectric element against a lens-retaining member using a simpler structure.

SUMMARY

A lens driving device according to embodiments of the present invention includes: a fixed member; a lens-retaining member; a guide mechanism; a piezoelectric driving portion; and a pressing member. The lens-retaining member is configured to retain a lens body. The guide mechanism is configured to guide the lens-retaining member so as to be movable relative to the fixed member in an optical-axis direction. The piezoelectric driving portion includes a piezoelectric element extending in a direction crossing the optical-axis direction, and is configured to move the lens-retaining member in the optical-axis direction. The pressing member is configured to press the piezoelectric driving portion against the lens-retaining member. The pressing member is formed of a leaf spring member. The pressing member includes: a fixed portion to be fixed to the fixed member; a support portion configured to support the piezoelectric driving portion; and an elastically deformable portion that is provided between the fixed portion and the support portion and is elastically deformable. The support portion includes: a plate-shaped base portion that is continuous with the elastically deformable portion; and a folded portion that is folded from the base portion in an L shape and projects toward the lens-retaining member. The piezoelectric driving portion is fixed to the folded portion.

BRIEF DESCRIPTION OF DRAWINGS

FIG. 3A is a top view of a base member, with a link mechanism being attached.

FIG. 3B is a left-hand side view of the base member, with the link mechanism being attached.

FIG. 5B is a front view of the lens-retaining member, with the link mechanism being attached.

FIG. 7B is a perspective view of the base member, with balls being attached.

FIG. 8B is a perspective view of a part of the base member.

FIG. 12B is an exploded perspective view of the piezoelectric driving portion.

FIG. 13A is a perspective view of a pressing member.

FIG. 15A is a front view of a part of the pressing member to which the piezoelectric driving portion is attached.

EMBODIMENTS

Figure 1A:
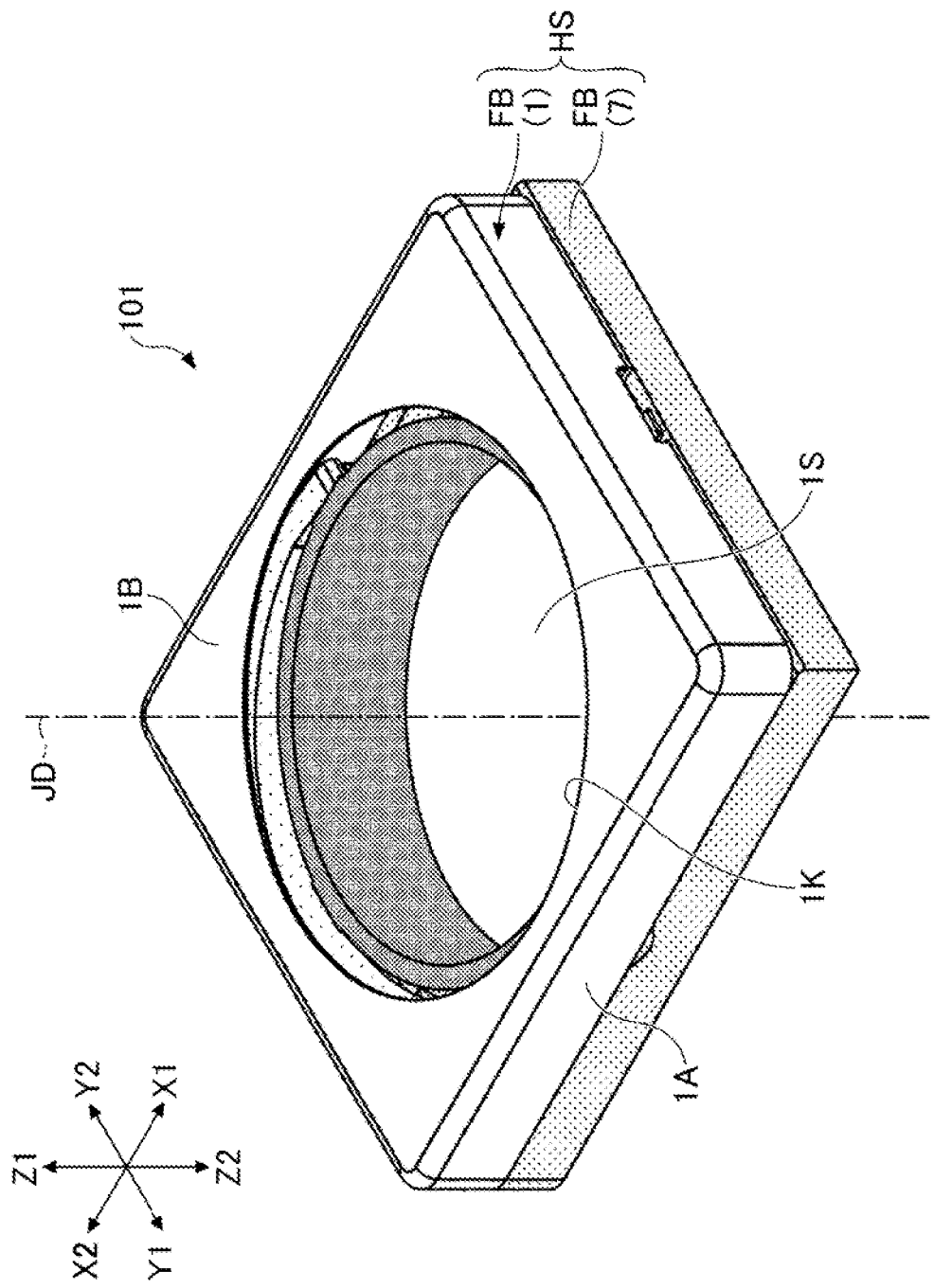
FIG. 1A is a perspective view of a lens driving device.
Figure 1B:
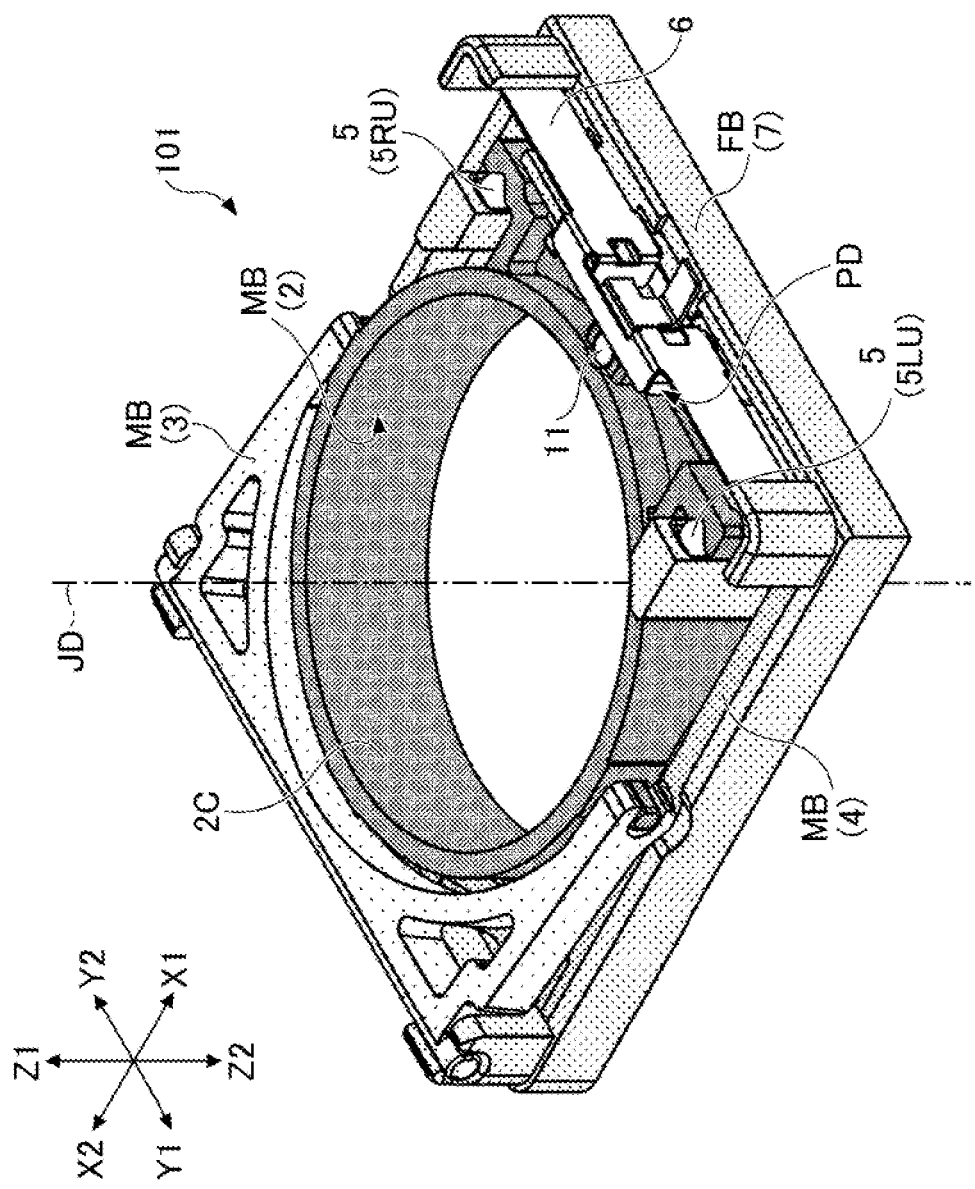
FIG. 1B is a perspective view of the lens driving device, with a cover member being removed.
Figure 2:
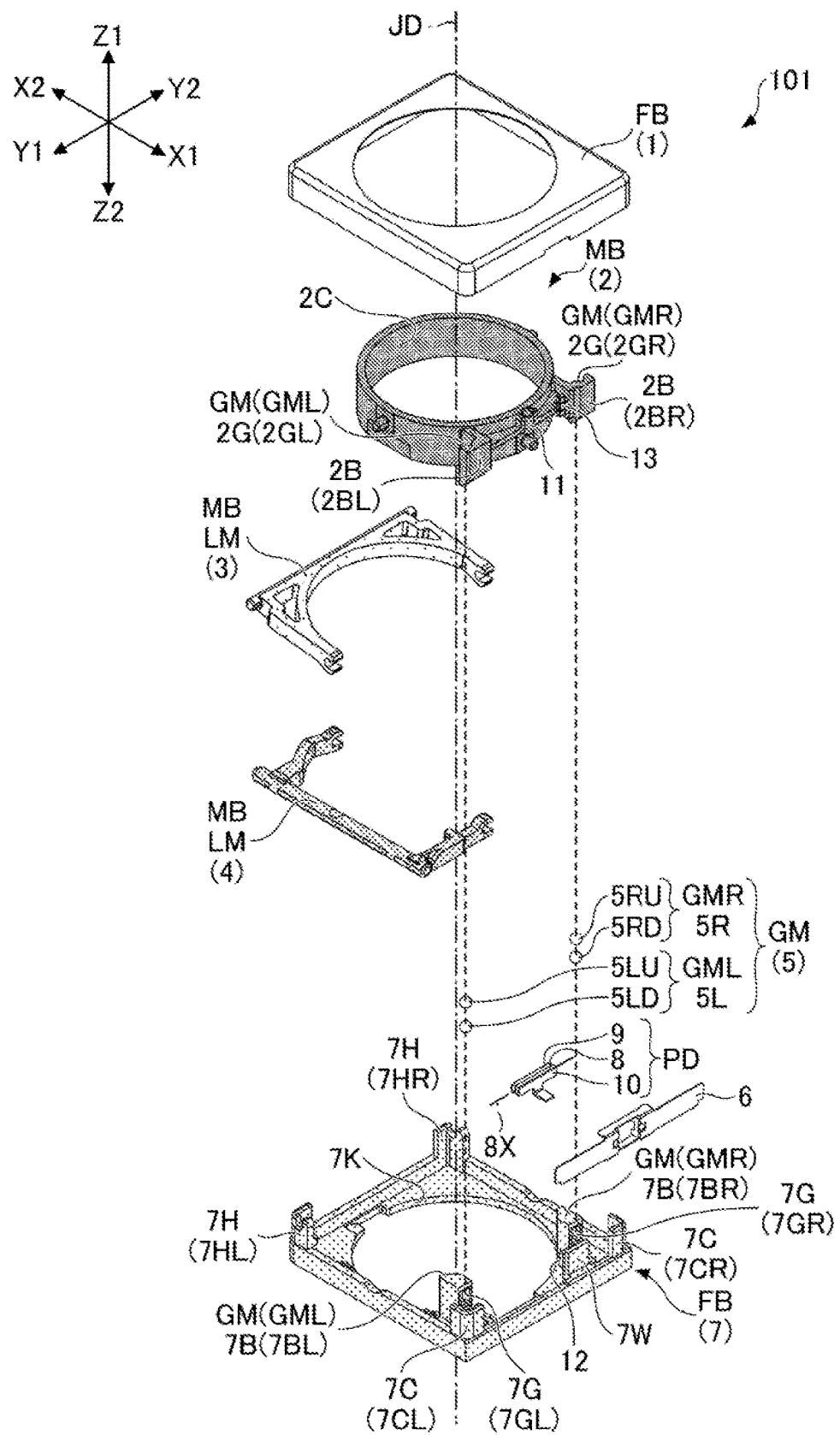
FIG. 2 is an exploded perspective view of the lens driving device.

Hereinafter, a lens driving device 101 according to the embodiments of the present invention will be described with reference to the drawings. FIG. 1A and FIG. 1B are perspective views of the lens driving device 101. Specifically, FIG. 1A is a perspective view of the entirety of the lens driving device 101, and FIG. 1B is a perspective view of the lens driving device 101, with a cover member 1 being removed. FIG. 2 is an exploded perspective view of the lens driving device 101.

In FIG. 1A and FIG. 1B, X1 denotes one direction of an X axis forming a three-dimensional rectangular coordinate system, and X2 denotes the other direction of the X axis. Also, Y1 denotes one direction of a Y axis forming the three-dimensional rectangular coordinate system, and Y2 denotes the other direction of the Y axis. Likewise, Z1 denotes one direction of a Z axis forming the three-dimensional rectangular coordinate system, and Z2 denotes the other direction of the Z axis. In the present embodiment, an X1 side of the lens driving device 101 corresponds to a front side (front-face side) of the lens driving device 101, and an X2 side of the lens driving device 101 corresponds to a back side (rear-face side) of the lens driving device 101. Also, a Y1 side of the lens driving device 101 corresponds to a left-hand side of the lens driving device 101, and a Y2 side of the lens driving device 101 corresponds to a right-hand side of the lens driving device 101. Further, a Z1 side of the lens driving device 101 corresponds to an upper side of the lens driving device 101, and a Z2 side of the lens driving device 101 corresponds to a lower side of the lens driving device 101. The same applies to the other drawings.

The lens driving device 101 includes, as illustrated in FIG. 2, a fixed member FB and a movable member MB. The fixed member FB includes a cover member 1 and a base member 7. The movable member MB includes a lens-retaining member 2 and a link mechanism LM. The movable member MB is configured to be guided in an optical-axis direction by a guide mechanism GM. The optical-axis direction includes a direction of an optical axis JD with regard to a lens body, and a direction in parallel to the optical axis JD. Also, the movable member MB is configured to be moved in the optical axis by a piezoelectric driving portion PD.

The cover member 1 is configured to cover the movable member MB. In the present embodiment, the cover member 1 is formed by processing a metal plate through, for example, punching or drawing. However, the cover member 1 may be formed from other materials such as synthetic resins. Specifically, the cover member 1 includes, as illustrated in FIG. 1A, an outer peripheral wall portion 1A that is rectangular and cylindrical, and a ceiling portion 1B that is flat plate-shaped and rectangularly annular, the ceiling portion 1B being provided so as to be continuous with the top end (Z1-side end) of the outer peripheral wall portion 1A. The ceiling portion 1B is provided with a circular opening 1K at a central portion thereof. The cover member 1 has a box-shaped outer shape defining a housing portion 1S. In the housing portion 1S, the movable member MB can be housed. Also, the cover member 1 is bonded to the base member 7 with an adhesive, thereby forming a casing HS with the base member 7.

The lens-retaining member 2 is configured to retain a lens body (not illustrated) with a cylindrical portion 2C. In the present embodiment, the lens-retaining member 2 is formed through injection molding of a synthetic resin such as a liquid crystal polymer (LCP). The lens body is, for example, a cylindrical lens barrel including at least one lens.

The link mechanism LM is one exemplary regulating mechanism. The regulating mechanism is a mechanism that is disposed between the lens-retaining member 2 and the fixed member FB, and is configured to suppress changes in posture when the lens-retaining member 2 moves in the optical-axis direction. The changes in posture of the lens-retaining member 2 include, for example, tilting of the optical axis JD to and from the Z-axis direction. In the present embodiment, the link mechanism LM includes a first link member 3 and a second link member 4, is disposed between the lens-retaining member 2 and the base member 7 serving as the fixed member FB, and is configured to suppress changes in posture when the lens-retaining member 2 moves in the optical-axis direction.

The piezoelectric driving portion PD is configured to move the lens-retaining member 2 along the optical-axis direction. In the present embodiment, the piezoelectric driving portion PD is one exemplary frictional driving portion utilizing a driving system disclosed in U.S. Pat. No. 7,786,648, and includes a piezoelectric element 8, a contact member 9, and a circuit board 10.

The piezoelectric element 8 is configured to realize a bending vibration in response to an applied voltage. In the present embodiment, the piezoelectric element 8 extends in the Y-axis direction orthogonal to the optical-axis direction (perpendicular to the optical axis JD) and is configured to realize a bending vibration having two nodes. Specifically, the piezoelectric element 8 has a dual-layered structure of a first layer that realizes a first bending vibration on an XY plane and a second layer that realizes a second bending vibration on a YZ plane. By individually applying voltages to the piezoelectric elements forming the first and second layers at appropriate timings, the piezoelectric element 8 can be driven so that the trajectory drawn by the middle point of the piezoelectric element 8 becomes a circular orbit about a rotation axis 8X. In the example as illustrated in FIG. 2, the rotation axis 8X is in parallel to the Y axis. By applying the voltages at appropriate timings, the piezoelectric driving portion PD can switch the moving direction (rotating direction) of the middle point following the circular orbit between clockwise and counterclockwise as viewed from the Y1 side. The lens-retaining member 2 is moved upward (Z1 direction) when the rotating direction of the middle point of the piezoelectric element 8 is clockwise, and is moved downward (Z2 direction) when the rotating direction of the middle point of the piezoelectric element 8 is counterclockwise. The middle point of the piezoelectric element 8 is a point at which the amplitude of the first bending vibration becomes the maximum (a point corresponding to an antinode of the first bending vibration) and is a point at which the amplitude of the second bending vibration becomes the maximum (a point corresponding to an antinode of the second bending vibration). In this way, the piezoelectric element 8 in the present embodiment is configured to realize a vibration in which the middle point of the piezoelectric element 8 draws a circle (circular motion). Note that, the circle drawn by the middle point of the piezoelectric element 8 (circular orbit) is not necessarily a perfect circle (true circle) but may be generally circular.

The contact member 9 is configured to be attached to the piezoelectric element 8 and contact the lens-retaining member 2. In the present embodiment, the contact member 9 is bonded to the inner surface of the piezoelectric element 8 with an adhesive so as to entirely cover the inner surface of the piezoelectric element 8 (the surface facing the optical axis JD). The contact member 9 is formed of metal such as stainless steel, and is configured to perform a bending vibration in response to the bending vibration of the piezoelectric element 8. In the present embodiment, the contact member 9 is a friction plate formed of stainless steel. The contact member 9 extends in the Y-axis direction, which is the same as the direction in which the piezoelectric element 8 extends. The contact member 9 is configured such that a middle portion of the contact member 9 in the extending direction thereof contacts a receiving member 11 attached to the lens-retaining member 2. Specifically, the contact member 9 is configured such that the contact member 9 contacts the receiving member 11 at a point where the amplitude of the bending vibration becomes the maximum (at an antinode of the bending vibration). The receiving member 11 is formed of metal such as stainless steel. In the present embodiment, the receiving member 11 is a cylindrical pin that is formed of stainless steel and extends in the optical-axis direction. The contact member 9 formed of the metal is brought into contact with the receiving member 11 formed of the metal because the lens-retaining member 2 formed of the synthetic resin is prevented from wearing due to contact with the contact member 9 formed of the metal. Note that, as long as contact between the contact member 9 and the receiving member 11 is attained, the length dimension of the contact member 9 in the Y-axis direction is not necessarily the same as that of the piezoelectric element 8.

The circuit board 10 is a board including an electrically conductive pattern, and is configured to electrically connect an external power source and the piezoelectric element 8. In the present embodiment, the circuit board 10 is a flexible printed board having flexibility, and is configured to apply a voltage to the piezoelectric element 8. The piezoelectric element 8 is bonded to the inner surface (facing the optical axis JD) of the circuit board 10 via an anisotropic electrically conductive adhesive. The piezoelectric element 8 may be bonded to the inner-surface side of the circuit board 10 via an anisotropic electrically conductive adhesive film.

The piezoelectric driving portion PD is configured to be pressed inward (in a direction becoming closer to the optical axis JD) by the pressing member 6 fixed to the base member 7 and pressed against the lens-retaining member 2. In the present embodiment, the pressing member 6 is formed of a metal plate, and is configured to contact, via the circuit board 10, the outer surface (farther surface from the optical axis JD) of the piezoelectric element 8 at portions thereof that respectively correspond to two nodes formed during the bending vibration of the piezoelectric element 8. Bonding between the pressing member 6 and the piezoelectric driving portion PD is realized with, for example, an adhesive.

The guide mechanism GM is configured to guide the lens-retaining member 2 so as to be movable relative to the fixed member FB in the optical-axis direction. In the present embodiment, the guide mechanism GM includes a groove 2G on the movable member side (hereinafter referred to as a "movable member-side groove 2G"), a groove 7G on the fixed member side (hereinafter referred to as a "fixed member-side groove 7G"), and a ball 5 held between the movable member-side groove 2G and the fixed member-side groove 7G. The movable member-side groove 2G is formed in a tubular portion 2B of the lens-retaining member 2, and the fixed member-side groove 7G is formed in a tubular portion 7B of the base member 7. Note that, the tubular portion 2B of the lens-retaining member 2 includes a left-hand tubular portion 2BL and a right-hand tubular portion 2BR, and the movable member-side groove 2G includes a left-hand movable member-side groove 2GL formed in the left-hand tubular portion 2BL, and a right-hand movable member-side groove 2GR formed in the right-hand tubular portion 2BR.

Specifically, the guide mechanism GM includes two guide portions (a right-hand guide portion GMR and a left-hand guide portion GML) that are disposed so as to face each other via the receiving member 11 attached to the lens-retaining member 2.

The right-hand guide portion GMR includes the right-hand movable member-side groove 2GR formed in the right-hand tubular portion 2BR of the lens-retaining member 2, a right-hand fixed member-side groove 7GR formed in a right-hand tubular portion 7BR of the base member 7, and a right-hand ball 5R disposed between the right-hand movable member-side groove 2GR and the right-hand fixed member-side groove 7GR. The right-hand ball 5R includes an upper right-hand ball 5RU and a lower right-hand ball 5RD.

The left-hand guide portion GML includes the left-hand movable member-side groove 2GL formed in the left-hand tubular portion 2BL of the lens-retaining member 2, a left-hand fixed member-side groove 7GL formed in a left-hand tubular portion 7BL of the base member 7, and a left-hand ball 5L disposed between the left-hand movable member-side groove 2GL and the left-hand fixed member-side groove 7GL. The left-hand ball 5L includes an upper left-hand ball 5LU and a lower left-hand ball 5LD.

Figure 3C:
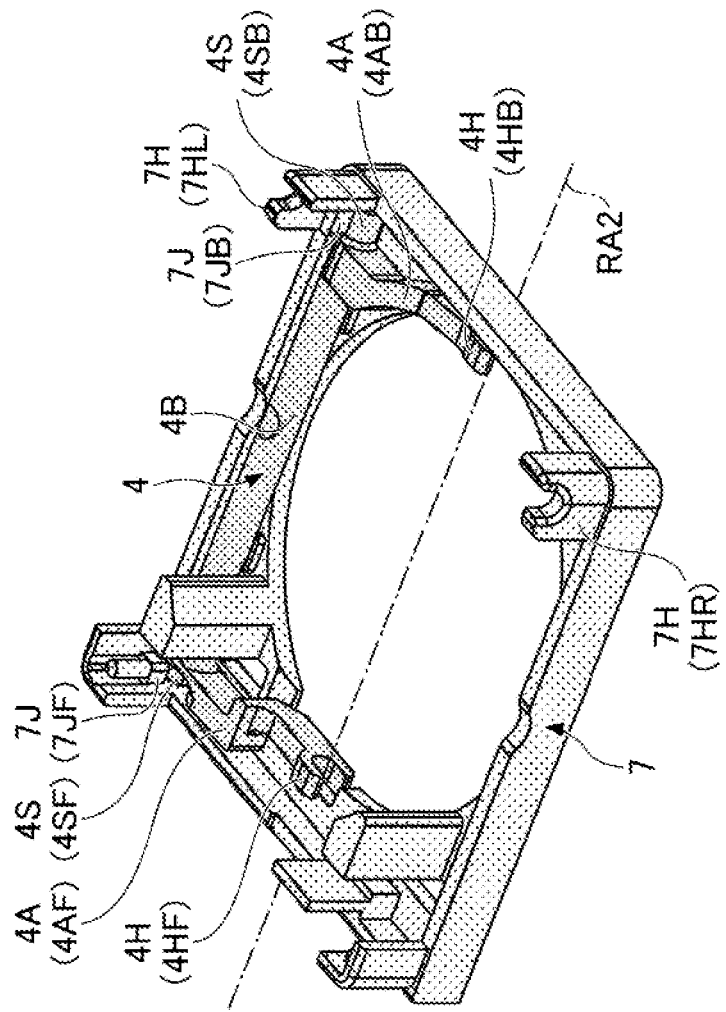
FIG. 3C is a perspective view of the base member, with only a second link member being attached.
Figure 3C:
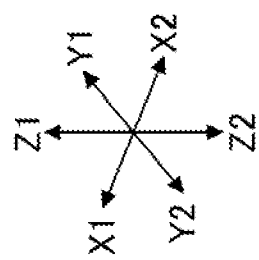

The base member 7 is formed through injection molding of a synthetic resin such as a liquid crystal polymer. In the present embodiment, as illustrated in FIG. 2, the base member 7 has a generally rectangular plate-shaped outer shape, and is provided with a circular opening 7K at a central portion thereof. Also, a surface (top surface) of the base member 7 on the subject side (Z1 side) is provided with two columnar portions 7B and one wall portion 7W, each of the columnar portions 7B and the wall portion 7W having a polygonal projecting shape that projects upward. Also, at two front-side corners of the base member 7, a holding portion 7C projecting upward is formed, and at two back-side corners of the base member 7, a third pivotally support portion 7H projecting upward is formed. The holding portion 7C is a portion configured to support the pressing member 6, and includes a left-hand holding portion 7CL and a right-hand holding portion 7CR. The third pivotally support portion 7H is a portion configured to support a third pivot 3S of the first link member 3, and includes a left-hand third pivotally support portion 7HL and a right-hand third pivotally support portion 7HR. Further, as illustrated in FIG. 3C, at the left-hand front-side corner and the left-hand back-side corner of the base member 7, a fourth pivotally support portion 7J is formed. The fourth pivotally support portion 7J is a portion that is opened at least rightward (Y2 side) so as to be able to support a fourth pivot 4S of the second link member 4, and includes a front-side fourth pivotally support portion 7JF and a back-side fourth pivotally support portion 7JB.

The wall portion 7W of the base member 7 is provided with a sensor 12. Specifically, the back surface (X2-oriented surface) of the wall portion 7W is provided with the sensor 12 so as to face a magnet 13 attached to the lens-retaining member 2, with the sensor 12 being mounted in an unillustrated circuit board for a sensor.

The sensor 12 is configured to detect the position of the movable member MB. In the present embodiment, the sensor 12 is formed of a Hall element, and is configured to measure an output voltage changing in accordance with the intensity of a magnetic field that the sensor 12 receives from a magnet 13 and detect the position of the movable member MB (lens-retaining member 2) containing the magnet 13. The sensor 12 may be configured to detect the position of the movable member MB utilizing a magneto resistive element such as a giant magneto resistive effect (GMR) element, a semiconductor magneto resistive (SMR) element, an anisotropic magneto resistive (AMR) element, or a tunnel magneto resistive (TMR) element.

The lens driving device 101 has an outer shape of a generally rectangular parallelepiped shape, and is attached onto a board (not illustrated) on which an image-capturing element (not illustrated) is mounted. A camera module is formed of the board, the lens driving device 101, a lens body (not illustrated) mounted to the lens-retaining member 2, and the image-capturing element mounted on the board so as to face the lens body. The piezoelectric element 8 is connected to an external power source via the circuit board 10. In response to a voltage applied to the piezoelectric element 8, the piezoelectric element 8 performs the first bending vibration and the second bending vibration, thereby generating such a force as to move the lens-retaining member 2 along the optical-axis direction. This force is a frictional force occurring upon contact between the receiving member 11 attached to the lens-retaining member 2, and the contact member 9 bonded to the piezoelectric element 8.

The lens driving device 101 utilizes this force to move the lens-retaining member 2 along the optical-axis direction on the Z1 side (the subject side) of the image-capturing element, thereby realizing an autofocus function. Specifically, the lens driving device 101 moves the lens-retaining member 2 in a direction becoming farther from the image-capturing element, thereby enabling macro photography, and moves the lens-retaining member 2 in a direction becoming closer to the image-capturing element, thereby enabling infinity focus shooting.

Figure 4A:
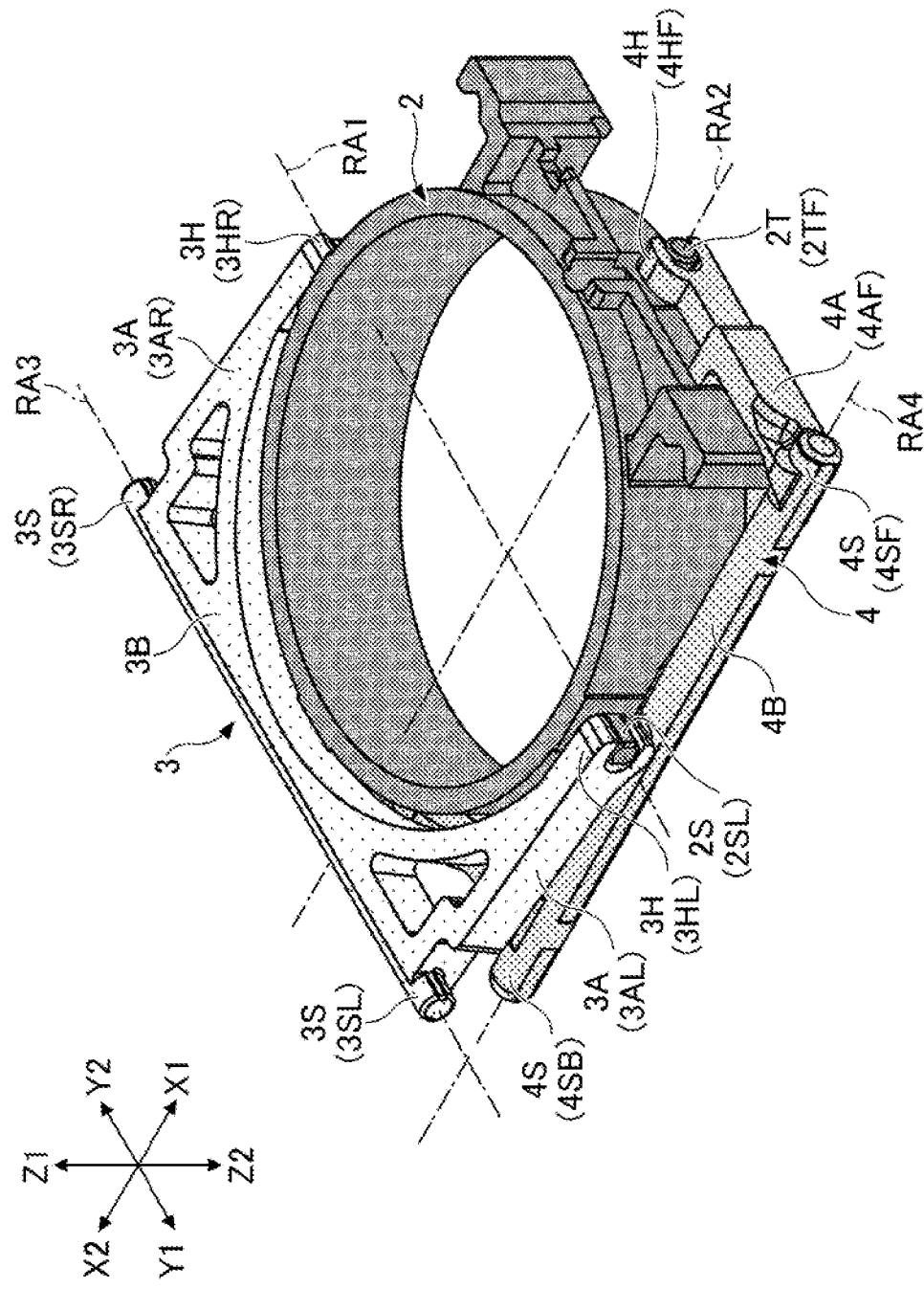
FIG. 4A is a perspective view of a lens-retaining member, with the link mechanism being attached.
Figure 4B:
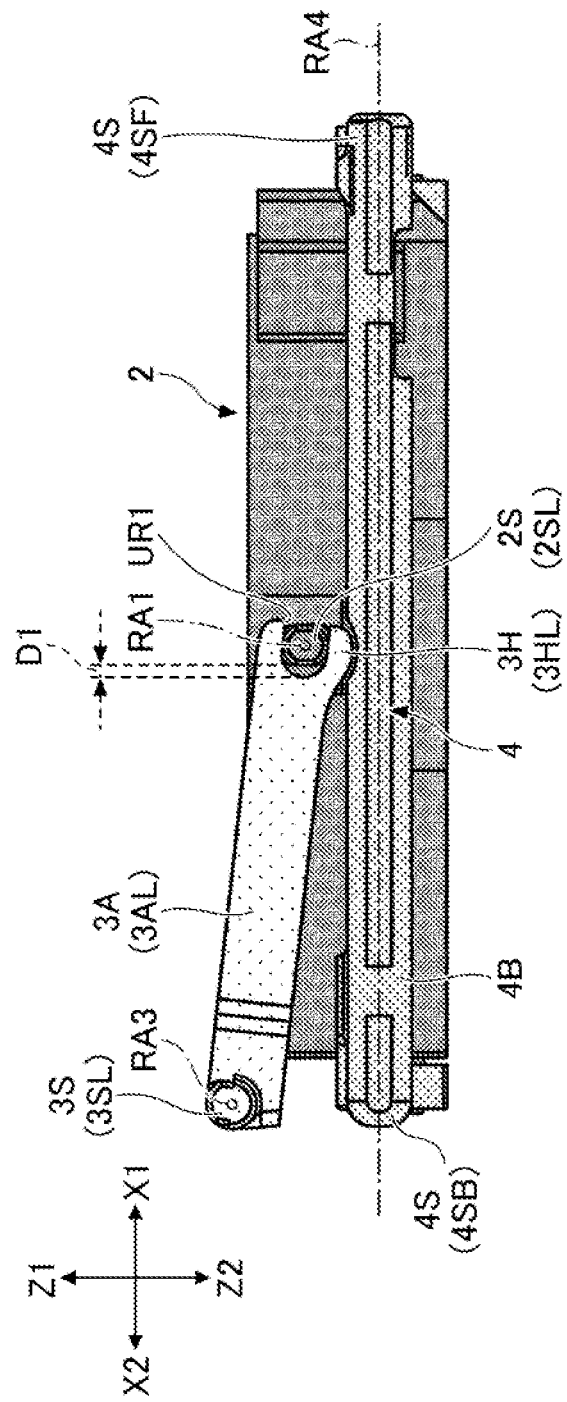
FIG. 4B is a left-hand side view of the lens-retaining member, with the link mechanism being attached.
Figure 4C:
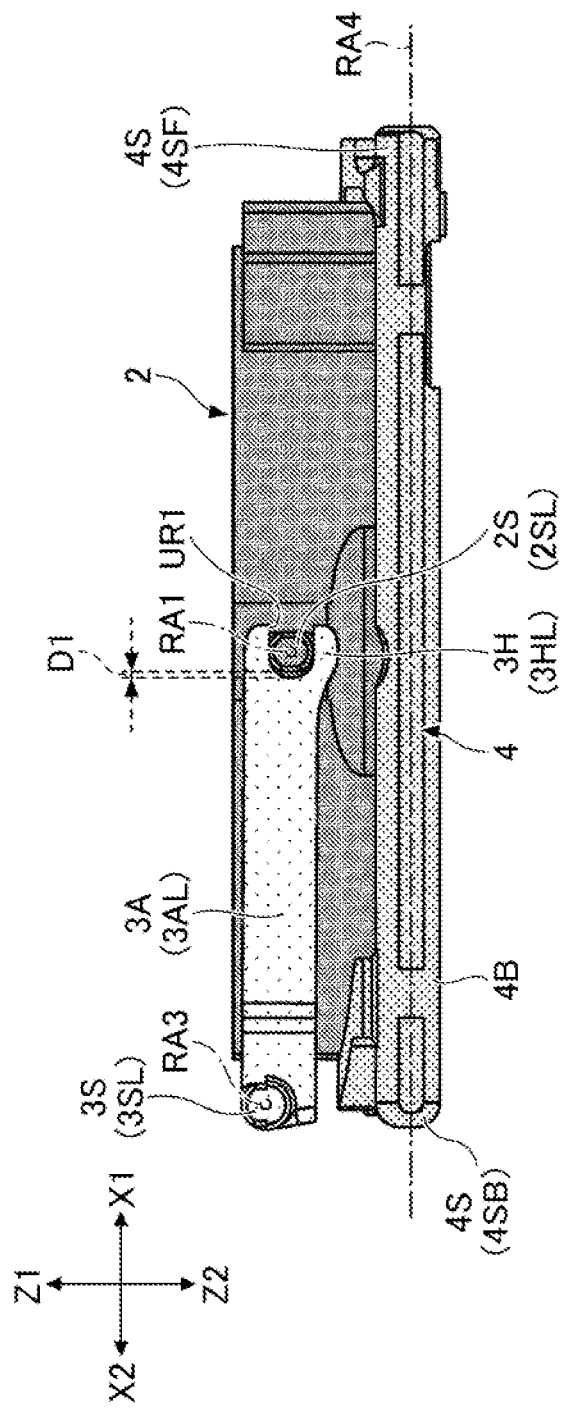
FIG. 4C is a left-hand side view of the lens-retaining member, with the link mechanism being attached.
Figure 5A:
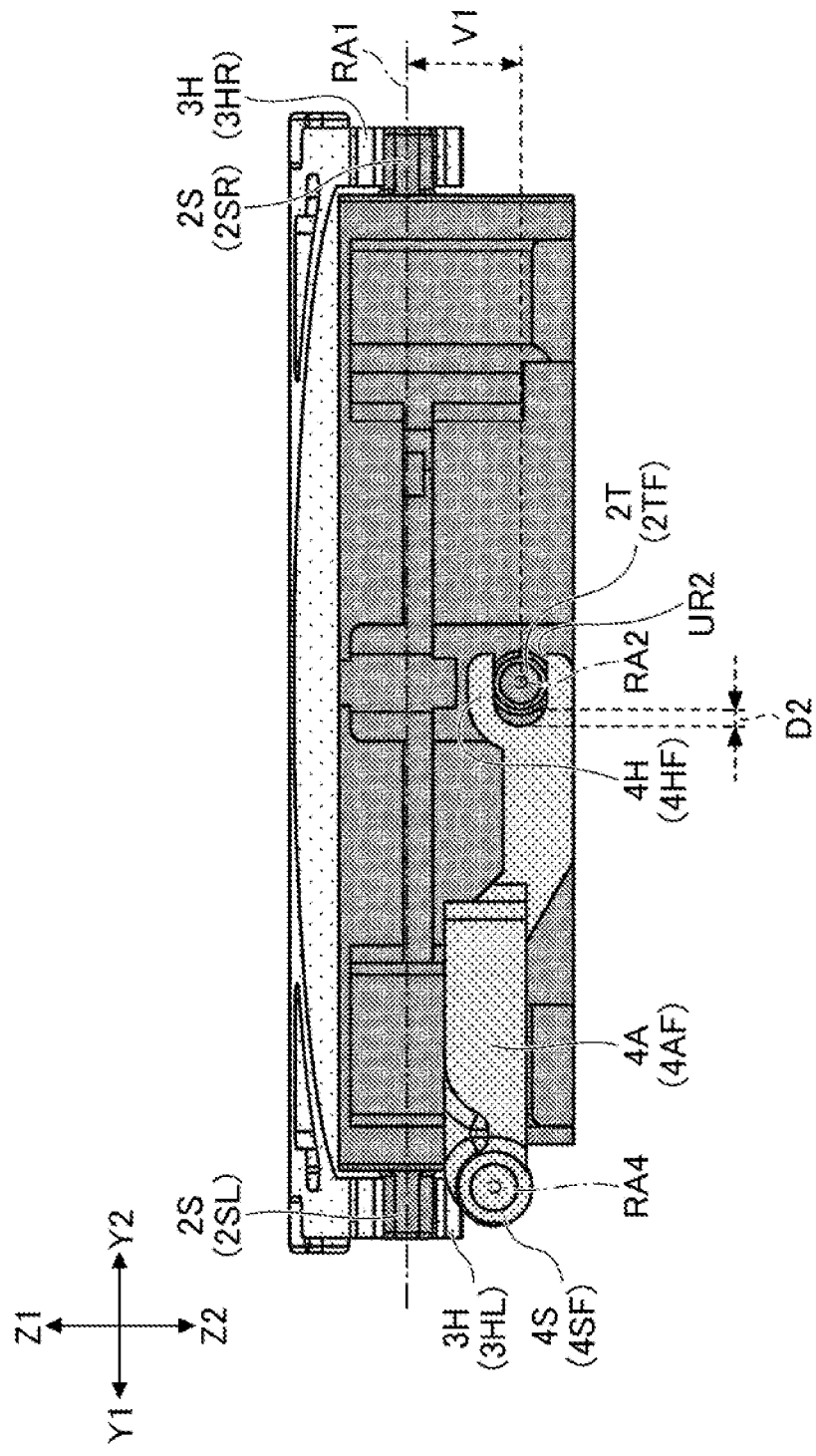
FIG. 5A is a front view of the lens-retaining member, with the link mechanism being attached.

Next, referring to FIG. 3A to FIG. 3C, FIG. 4A to FIG. 4C, and FIG. 5A and FIG. 5B, details of the link mechanism LM, one exemplary regulating mechanism, will be described. FIG. 3A to FIG. 3C are views of the base member 7, with the link mechanism LM being attached. Specifically, FIG. 3A is a top view of the base member 7, with the link mechanism LM being attached. FIG. 3B is a left-hand side view of the base member 7, with the link mechanism LM being attached. FIG. 3C is a perspective view of the base member 7, with only the second link member 4 being attached. Note that, FIG. 3A to FIG. 3C each illustrate a state in which the lens-retaining member 2 movable in the optical-axis direction is located at the lowermost position (Z2 side). FIG. 4A to FIG. 4C and FIG. 5A and FIG. 5B are views of the lens-retaining member 2, with the link mechanism LM being attached. Specifically, FIG. 4A is a perspective view of the lens-retaining member 2, with the link mechanism LM being attached. FIG. 4B and FIG. 4C are left-hand side views of the lens-retaining member 2, with the link mechanism LM being attached. FIG. 5A and FIG. 5B are front views of the lens-retaining member 2, with the link mechanism LM being attached. Note that, FIG. 4A and FIG. 4B each illustrate a state in which the lens-retaining member 2 is located at the lowermost position (Z2 side) and FIG. 4C illustrates a state in which the lens-retaining member 2 is located at the uppermost position (Z1 side). Also, FIG. 5A illustrates a state in which the lens-retaining member 2 is located at the lowermost position (Z2 side), and FIG. 5B illustrates a state in which the lens-retaining member 2 is located at the uppermost position (Z1 side).

As illustrated in FIG. 3A to FIG. 3C, FIG. 4A to FIG. 4C, and FIG. 5A and FIG. 5B, the link mechanism LM includes the first link member 3 and the second link member 4. In the present embodiment, the first link member 3 and the second link member 4 are formed through injection molding of a synthetic resin such as a liquid crystal polymer (LCP).

The first link member 3 is linked to the lens-retaining member 2 so as to be pivotally movable about a first pivotal axis RA1, and the second link member 4 is linked to the lens-retaining member 2 so as to be pivotally movable about a second pivotal axis RA2. Also, the first link member 3 is linked to the base member 7 so as to be pivotally movable about a third pivotal axis RA3, and the second link member 4 is linked to the base member 7 so as to be pivotally movable about a fourth pivotal axis RA4. Also, the first pivotal axis RA1 and the third pivotal axis RA3 are in parallel to each other, and the second pivotal axis RA2 and the fourth pivotal axis RA4 are in parallel to each other. Also, in a plan view from the optical-axis direction, the first pivotal axis RA1 and the third pivotal axis RA3 are orthogonal to the second pivotal axis RA2 and the fourth pivotal axis RA4, respectively. Specifically, in the plan view from the optical-axis direction, the first pivotal axis RA1 and the second pivotal axis RA2 are orthogonal to each other at a position of the optical axis JD, and the third pivotal axis RA3 and the fourth pivotal axis RA4 are orthogonal to each other at a position of the left-hand back-side corner of the base member 7. Also, the first pivotal axis RA1 and the second pivotal axis RA2 are orthogonal to the optical-axis direction.

Figure 8A:
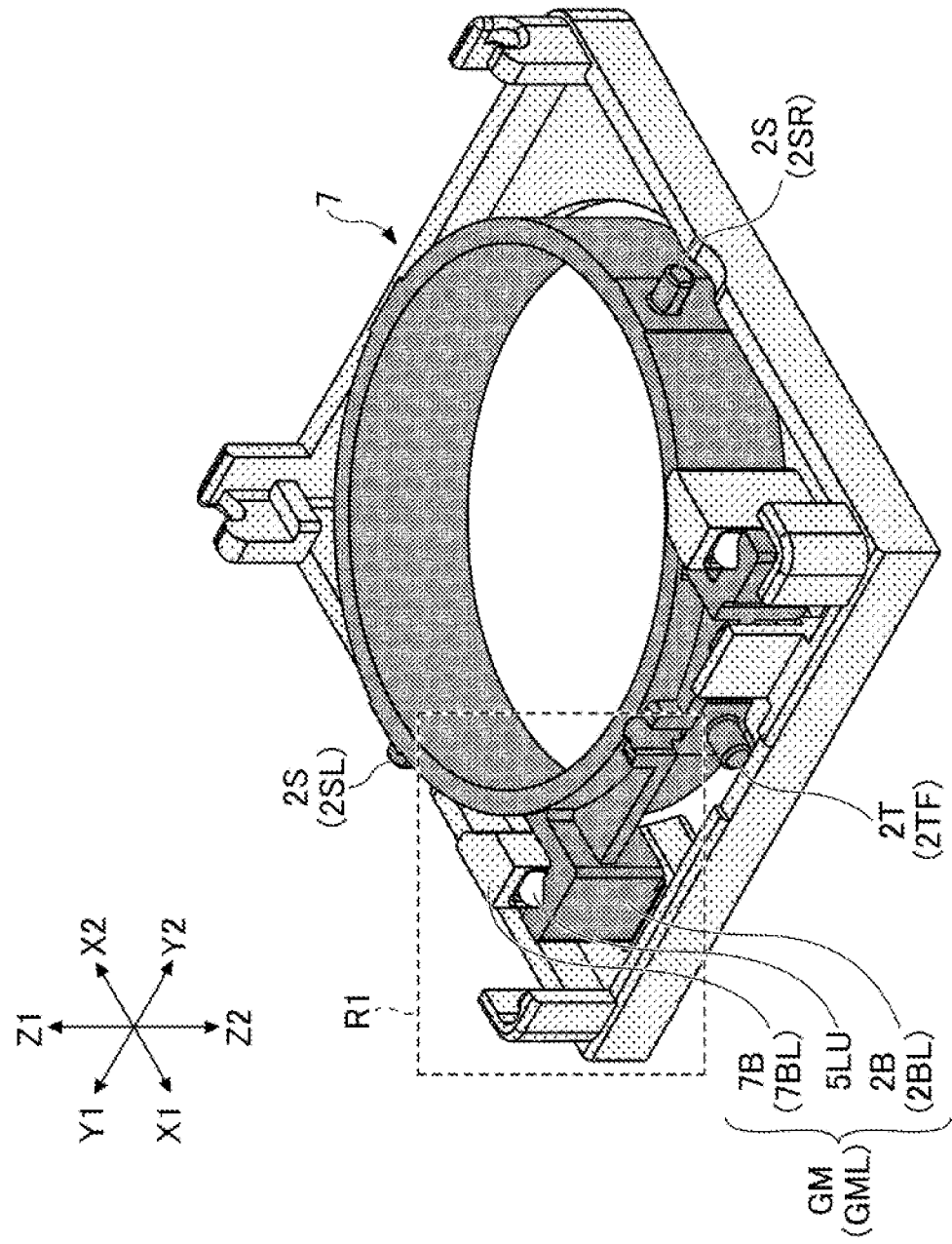
FIG. 8A is a perspective view of the entirety of the base member, with the lens-retaining member and the balls being attached.
Figure 10A:
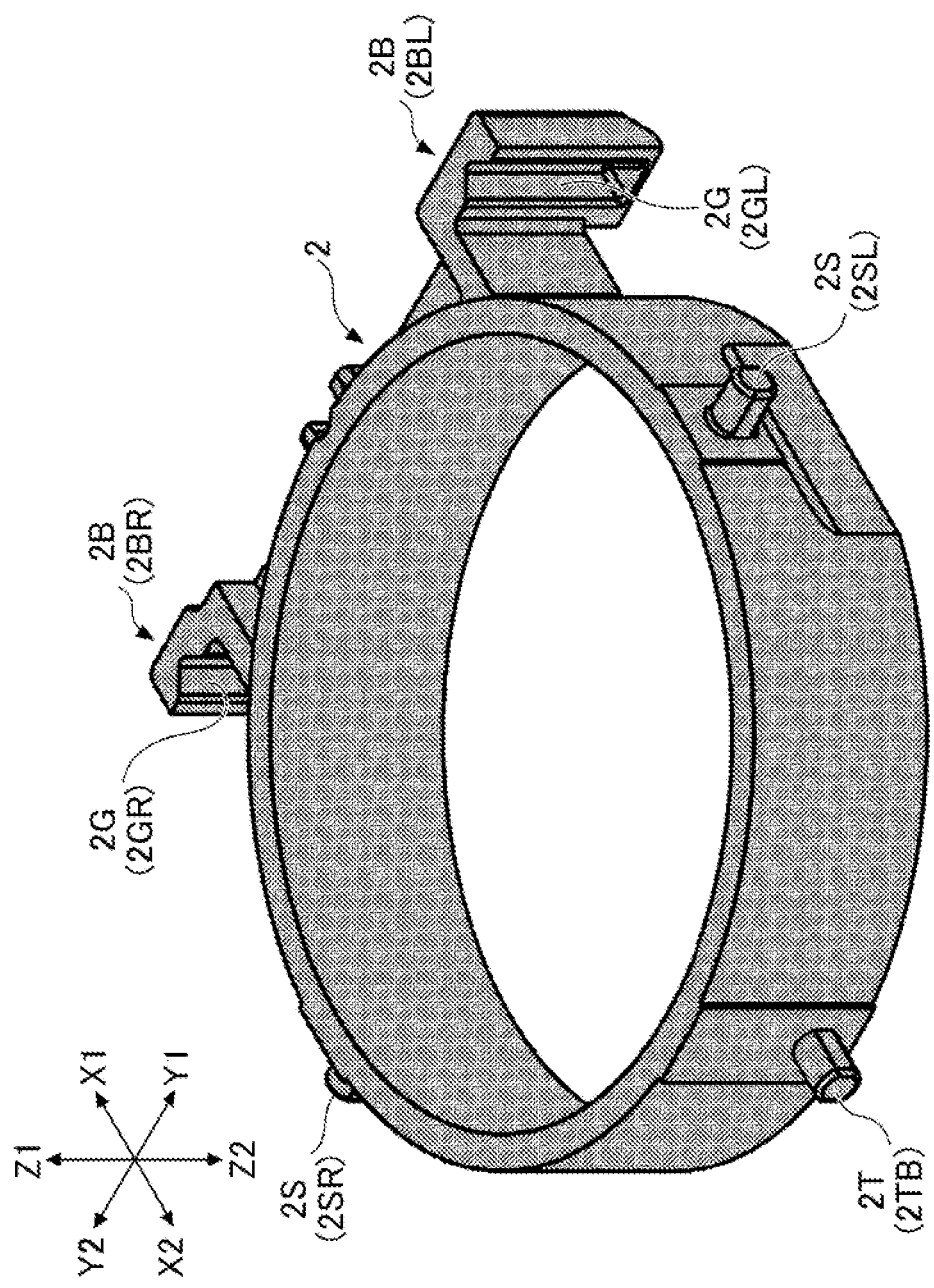
FIG. 10A is a perspective view of the lens-retaining member.

As illustrated in FIG. 5A, FIG. 8A, and FIG. 10A, the lens-retaining member 2 includes a pair of first pivots 2S (a left-hand first pivot 2SL and a right-hand first pivot 2SR) and a pair of second pivots 2T (a front-side second pivot 2TF and a back-side second pivot 2TB).

As illustrated in FIG. 3A, the first link member 3 includes: a first base portion 3B in which a pair of third pivots 3S (a left-hand third pivot 3SL and a right-hand third pivot 3SR) are formed, the pair of third pivots 3S being pivotally movably supported by the base member 7; and a pair of first arm portions 3A (a left-hand first arm portion 3AL and a right-hand first arm portion 3AR) that are continuous with the first base portion 3B and face each other. The pair of first arm portions 3A include, at tip portions thereof, first pivotally support portions 3H (a left-hand first pivotally support portion 3HL and a right-hand first pivotally support portion 3HR). As illustrated in FIG. 5A, the left-hand first pivotally support portion 3HL supports the left-hand first pivot 2SL formed in the lens-retaining member 2, and the right-hand first pivotally support portion 3HR supports the right-hand first pivot 2SR formed in the lens-retaining member 2. As illustrated in FIG. 3A, the left-hand third pivot 3SL is supported by the left-hand third pivotally support portion 7HL formed at the left-hand back-side corner of the base member 7, and the right-hand third pivot 3SR is supported by the right-hand third pivotally support portion 7HR formed at the right-hand back-side corner of the base member 7.

As illustrated in FIG. 3C, the second link member 4 includes: a second base portion 4B in which a pair of fourth pivots 4S (a front-side fourth pivot 4SF and a back-side fourth pivot 4SB) are formed, the pair of fourth pivots 4S being pivotally movably supported by the base member 7; and a pair of second arm portions 4A (a front-side second arm portion 4AF and a back-side second arm portion 4AB) that are continuous with the second base portion 4B and face each other. The pair of second arm portions 4A include, at tip portions thereof, second pivotally support portions 4H (a front-side second pivotally support portion 4HF and a back-side second pivotally support portion 4HB). The front-side second pivotally support portion 4HF supports the front-side second pivot 2TF (see FIG. 8A) formed in the lens-retaining member 2, and the back-side second pivotally support portion 4HB supports the back-side second pivot 2TB (see FIG. 10A) formed in the lens-retaining member 2. Further, as illustrated in FIG. 3C, the front-side fourth pivot 4SF is supported by the front-side fourth pivotally support portion 7JF formed at the left-hand front-side corner of the base member 7, and the back-side fourth pivot 4SB is supported by the back-side fourth pivotally support portion 7JB formed at the left-hand back-side corner of the base member 7.

In this way, the lens-retaining member 2 and the first link member 3 are linked together via the first pivot 2S and the first pivotally support portion 3H, and the lens-retaining member 2 and the second link member 4 are linked together via the second pivot 2T and the second pivotally support portion 4H.

In the present embodiment, the first pivotally support portion 3H has a first recessed portion UR1 formed in a U shape that is opened on the front side (X1 side), as illustrated in FIG. 4B. The first pivot 2S is located in the first recessed portion UR1. The first pivot 2S and the first recessed portion UR1 are structured so as to be able to form a gap D1 between the inner bottom face of the first recessed portion UR1 and the first pivot 2S.

The second pivotally support portion 4H has a second recessed portion UR2 formed in a U shape that is opened on the right-hand side (Y2 side), as illustrated in FIG. 5A. The second pivot 2T is located in the second recessed portion UR2. The second pivot 2T and the second recessed portion UR2 are structured so as to be able to form a gap D2 between the inner bottom face of the second recessed portion UR2 and the second pivot 2T.

The link mechanism LM is configured such that the gap D1 and the gap D2 change in size when the lens-retaining member 2 moves along the optical-axis direction. This is for suppressing changing in posture of the lens-retaining member 2 when the lens-retaining member 2 moves along the optical-axis direction. In the present embodiment, the link mechanism LM is configured such that the gap D1 becomes smaller in size when the lens-retaining member 2 moves upward (Z1 direction), as illustrated in FIG. 4B and FIG. 4C. Also, the link mechanism LM is configured such that the gap D2 becomes smaller in size when the lens-retaining member 2 moves upward (Z1 direction), as illustrated in FIG. 5A and FIG. 5B.

Figure 6A:
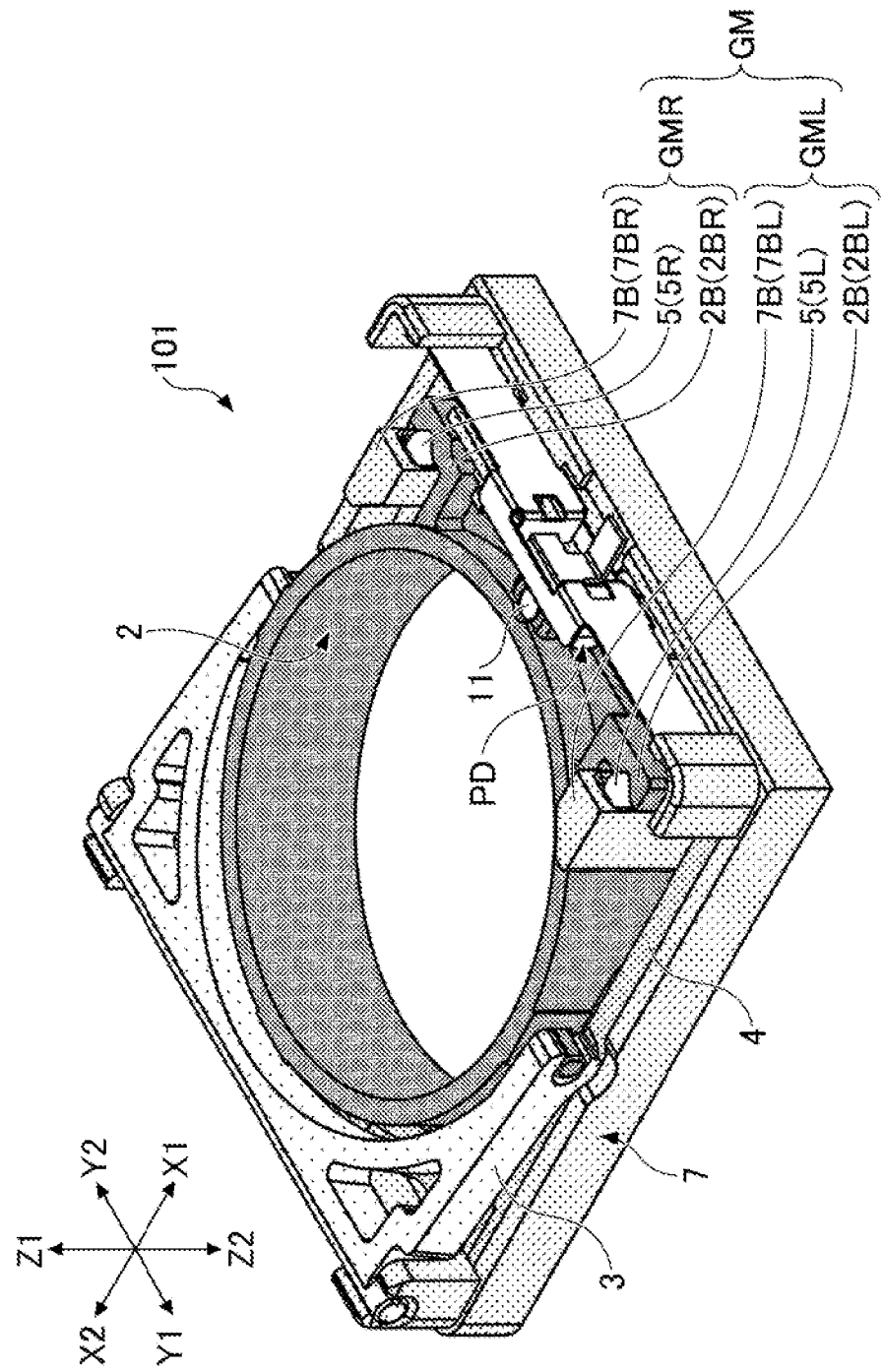
FIG. 6A is a perspective view of the lens driving device, with the cover member being removed.
Figure 6B:
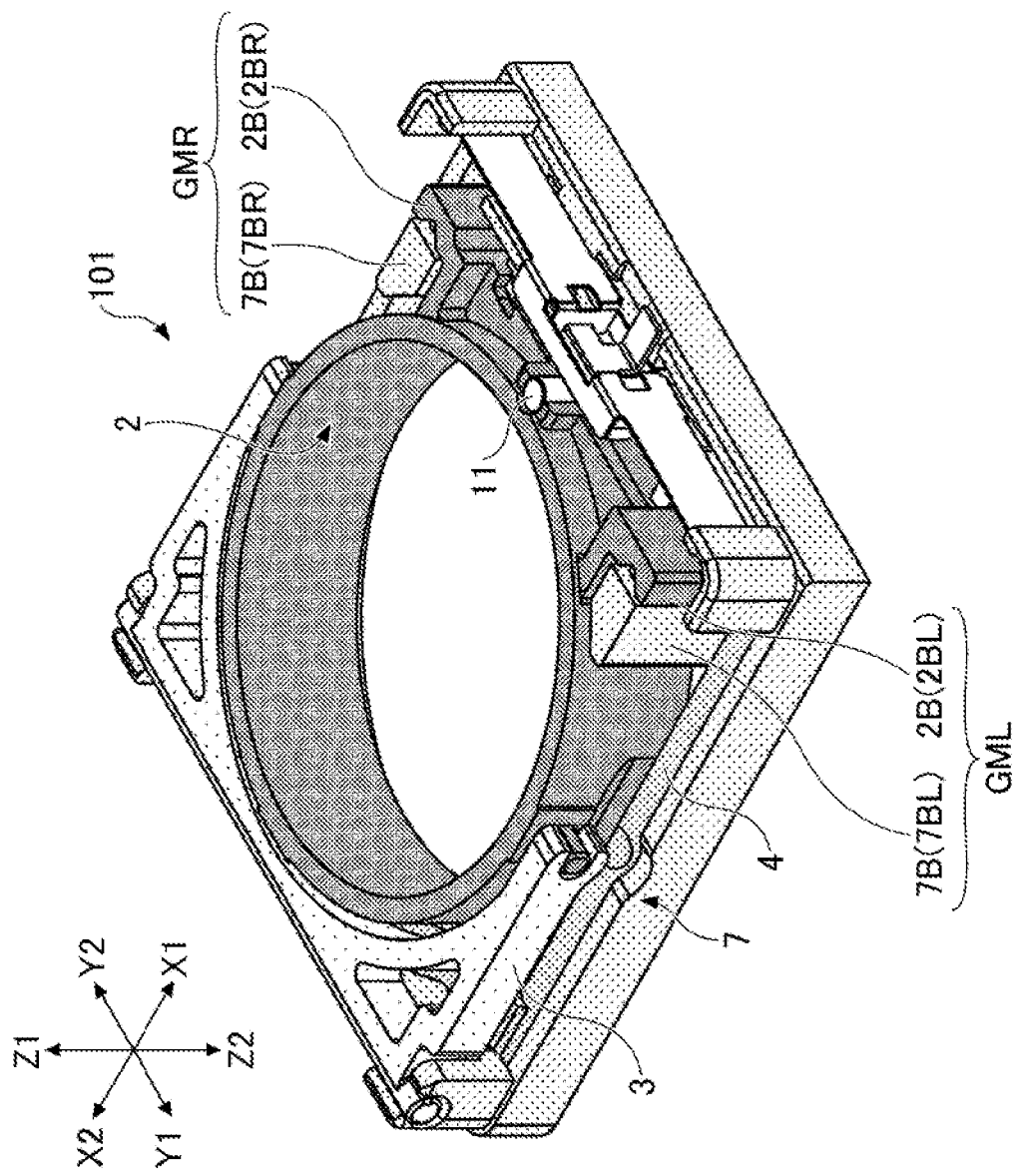
FIG. 6B is a perspective view of the lens driving device, with the cover member being removed.
Figure 7A:
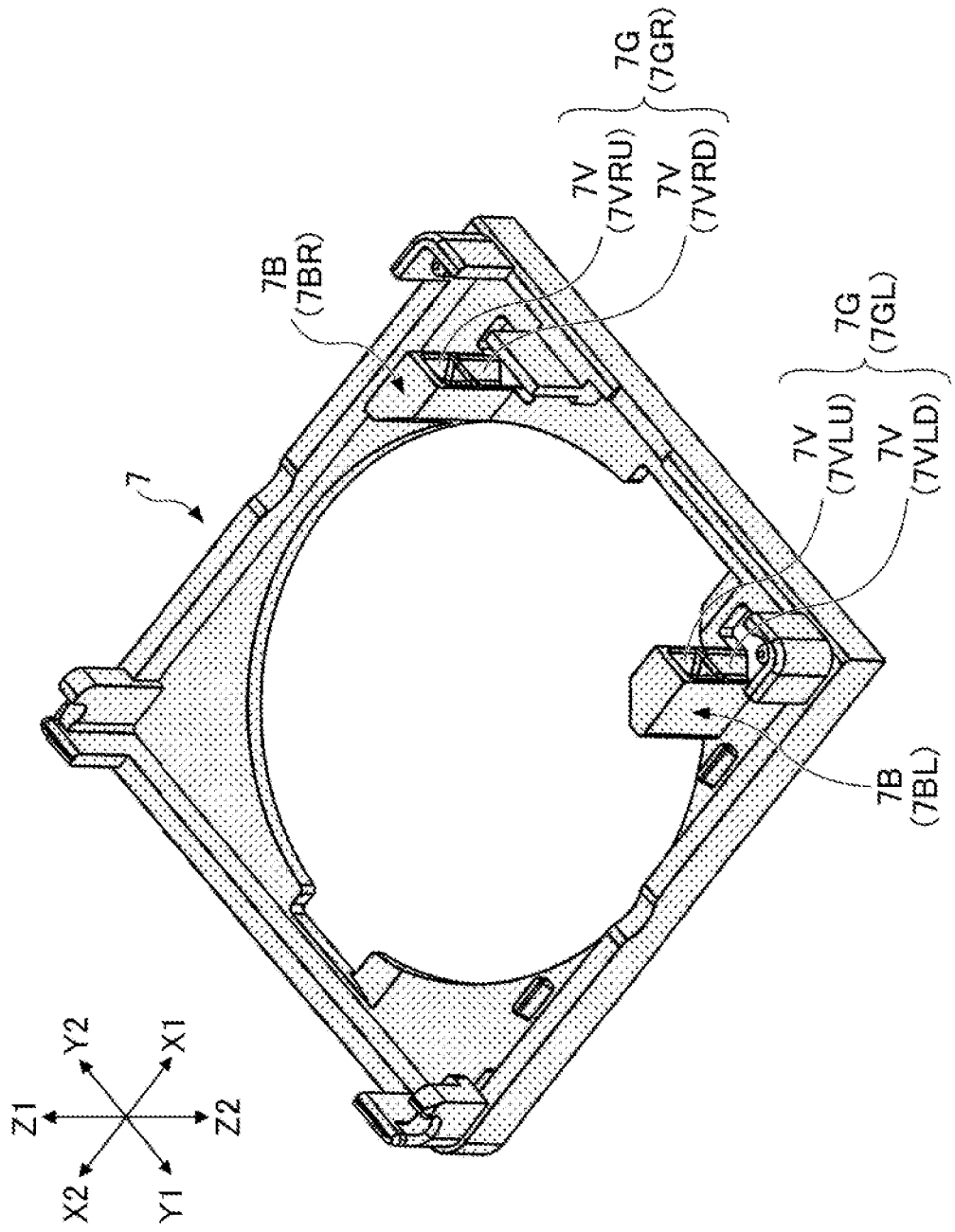
FIG. 7A is a perspective view of the base member.
Figure 9A:
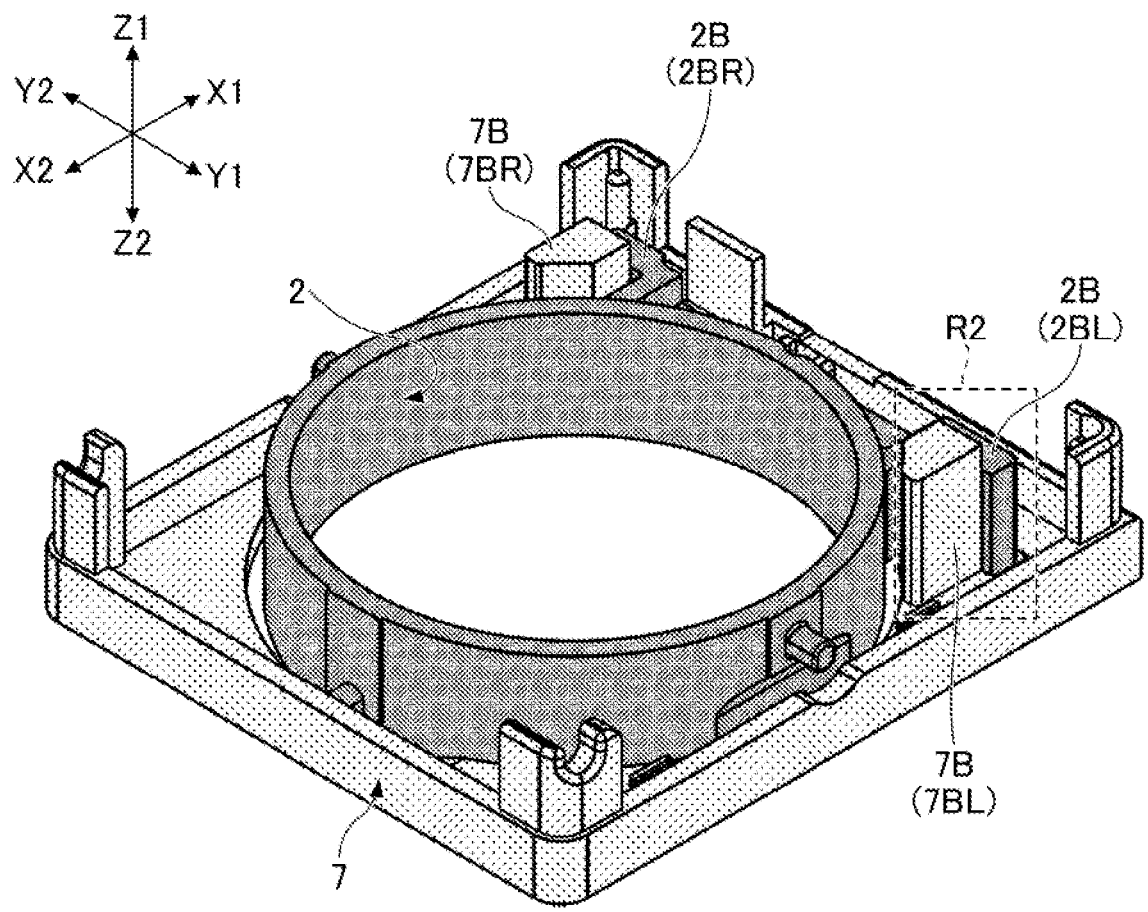
FIG. 9A is a perspective view of the entirety of the lens-retaining member attached to the base member.
Figure 9B:
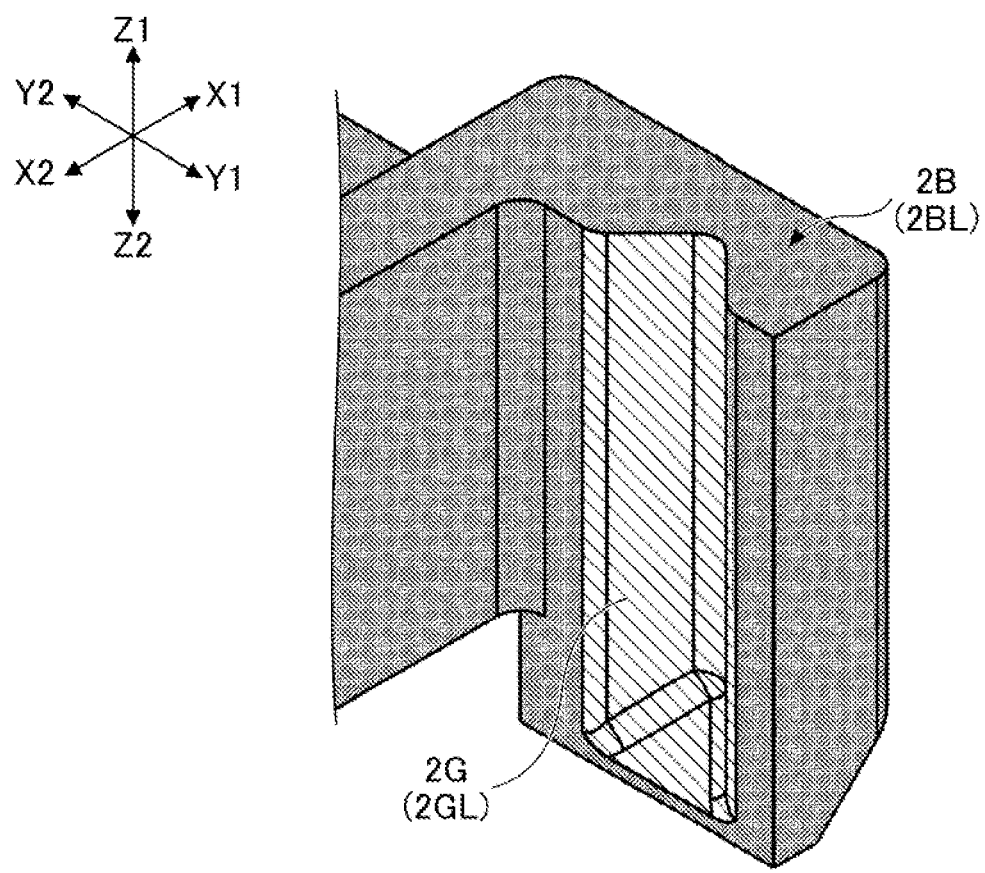
FIG. 9B is a perspective view of a part of the lens-retaining member.
Figure 10B:
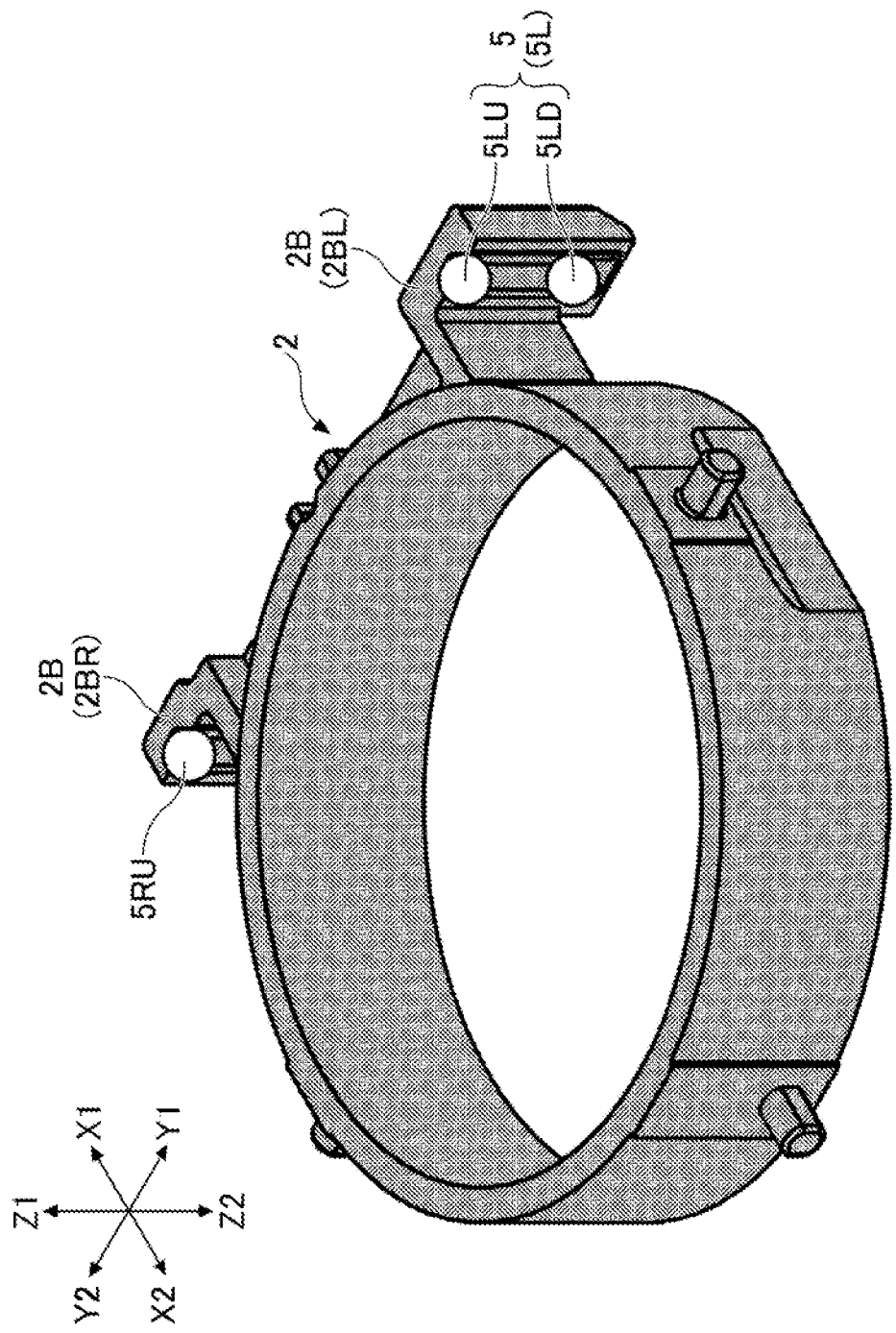
FIG. 10B is a perspective view of the lens-retaining member to which the balls are attached.

Next, referring to FIG. 6A, FIG. 6B, FIG. 7A, FIG. 7B, FIG. 8A, FIG. 8B, FIG. 9A, FIG. 9B, FIG. 10A, and FIG. 10B, details of the guide mechanism GM will be described. FIG. 6A and FIG. 6B are perspective views of the lens driving device 101, with the cover member 1 being removed. Specifically, FIG. 6A illustrates a state in which the lens-retaining member 2 is located at the lowermost position (Z2 side), and FIG. 6B illustrates a state in which the lens-retaining member 2 is located at the uppermost position (Z1 side). FIG. 7A and FIG. 7B are perspective views of the entirety of the base member 7. Specifically, FIG. 7A illustrates a state in which the ball 5 is not disposed in the fixed member-side groove 7G formed in the columnar portion 7B of the base member 7, and FIG. 7B illustrates a state in which the ball 5 is disposed in the fixed member-side groove 7G. FIG. 8A and FIG. 8B are forward perspective views of the guide mechanism GM. Specifically, FIG. 8A is a perspective view of the entirety of the base member 7 to which the lens-retaining member 2 and the ball 5 are attached, and FIG. 8B is an enlarged view of a region R1 surrounded by a dashed line shown in FIG. 8A. Note that, in FIG. 8B, for ease of understanding, the members other than the base member 7 are not illustrated. FIG. 9A and FIG. 9B are rearward perspective views of the guide mechanism GM. Specifically, FIG. 9A is a perspective view of the entirety of the lens-retaining member 2 attached to the base member 7, and FIG. 9B is an enlarged view of a region R2 surrounded by a dashed line shown in FIG. 9A. Note that, in FIG. 9B, for ease of understanding, the members other than the lens-retaining member 2 are not illustrated. FIG. 10A and FIG. 10B are perspective views of the entirety of the lens-retaining member 2. Specifically, FIG. 10A illustrates a state in which the ball 5 is not disposed in the movable member-side groove 2G formed in the tubular portion 2B of the lens-retaining member 2, and FIG. 10B illustrates a state in which the ball 5 is disposed in the movable member-side groove 2G.

As illustrated in FIG. 6A, FIG. 6B, FIG. 7A, FIG. 7B, FIG. 8A, FIG. 8B, FIG. 9A, FIG. 9B, FIG. 10A, and FIG. 10B, the guide mechanism GM includes the right-hand guide portion GMR and the left-hand guide portion GML that are disposed so as to face each other via the receiving member 11 in a left-and-right direction (Y-axis direction). Specifically, the right-hand guide portion GMR includes: the right-hand movable member-side groove 2GR (see FIG. 10A) provided in the right-hand tubular portion 2BR of the lens-retaining member 2; the right-hand fixed member-side groove 7GR (see FIG. 7A) provided in the base member 7 and facing the right-hand movable member-side groove 2GR; and the right-hand ball 5R (see FIG. 7B) disposed between the right-hand movable member-side groove 2GR and the right-hand fixed member-side groove 7GR.

Specifically, as illustrated in FIG. 7A, the right-hand fixed member-side groove 7GR is divided into two recessed portions 7V. The recessed portions 7V include a right-hand upper recessed portion 7VRU and a right-hand lower recessed portion 7VRD. As illustrated in FIG. 7B, the right-hand ball 5R includes a right-hand upper ball 5RU housed in the right-hand upper recessed portion 7VRU, and a right-hand lower ball 5RD housed in the right-hand lower recessed portion 7VRD. Meanwhile, as illustrated in FIG. 10A, the right-hand movable member-side groove 2GR is not divided into two recessed portions and continuously extends in the optical-axis direction (Z-axis direction). With this configuration, the right-hand upper ball 5RU and the right-hand lower ball 5RD are maintained to be spaced at a predetermined interval without becoming closer to each other even when the lens-retaining member 2 moves along the optical-axis direction. This is because the right-hand upper ball 5RU and the right-hand lower ball 5RD are restricted from moving in the optical-axis direction by the right-hand upper recessed portion 7VRU and the right-hand lower recessed portion 7VRD.

Likewise, the left-hand guide portion GML includes: the left-hand movable member-side groove 2GL (see FIG. 10A) provided in the left-hand tubular portion 2BL of the lens-retaining member 2; the left-hand fixed member-side groove 7GL (see FIG. 7A) provided in the base member 7 and facing the left-hand movable member-side groove 2GL; and the left-hand ball 5L (see FIG. 7B) disposed between the left-hand movable member-side groove 2GL and the left-hand fixed member-side groove 7GL.

Specifically, as illustrated in FIG. 8B, the left-hand fixed member-side groove 7GL is divided into two recessed portions 7V. The recessed portions 7V include a left-hand upper recessed portion 7VLU and a left-hand lower recessed portion 7VLD. As illustrated in FIG. 7B, the left-hand ball 5L includes a left-hand upper ball 5LU housed in the left-hand upper recessed portion 7VLU, and a left-hand lower ball 5LD housed in the left-hand lower recessed portion 7VLD. Meanwhile, as illustrated in FIG. 9B, the left-hand movable member-side groove 2GL is not divided into two recessed portions and continuously extends in the optical-axis direction (Z-axis direction). With this configuration, the left-hand upper ball 5LU and the left-hand lower ball 5LD are maintained to be spaced at a predetermined interval as illustrated in FIG. 10B without becoming closer to each other even when the lens-retaining member 2 moves along the optical-axis direction. This is because the left-hand upper ball 5LU and the left-hand lower ball 5LD are restricted from moving in the optical-axis direction by the left-hand upper recessed portion 7VLU and the left-hand lower recessed portion 7VLD.

By the above-described guide mechanism GM included in the lens driving device 101, the lens driving device 101 enables the lens-retaining member 2 to smoothly move along the optical-axis direction. Also, by the above-described link mechanism LM included in the lens driving device 101, the lens driving device 101 can suppress tilting of the lens-retaining member 2 when the lens-retaining member 2 moves along the optical-axis direction.

Figure 11A:
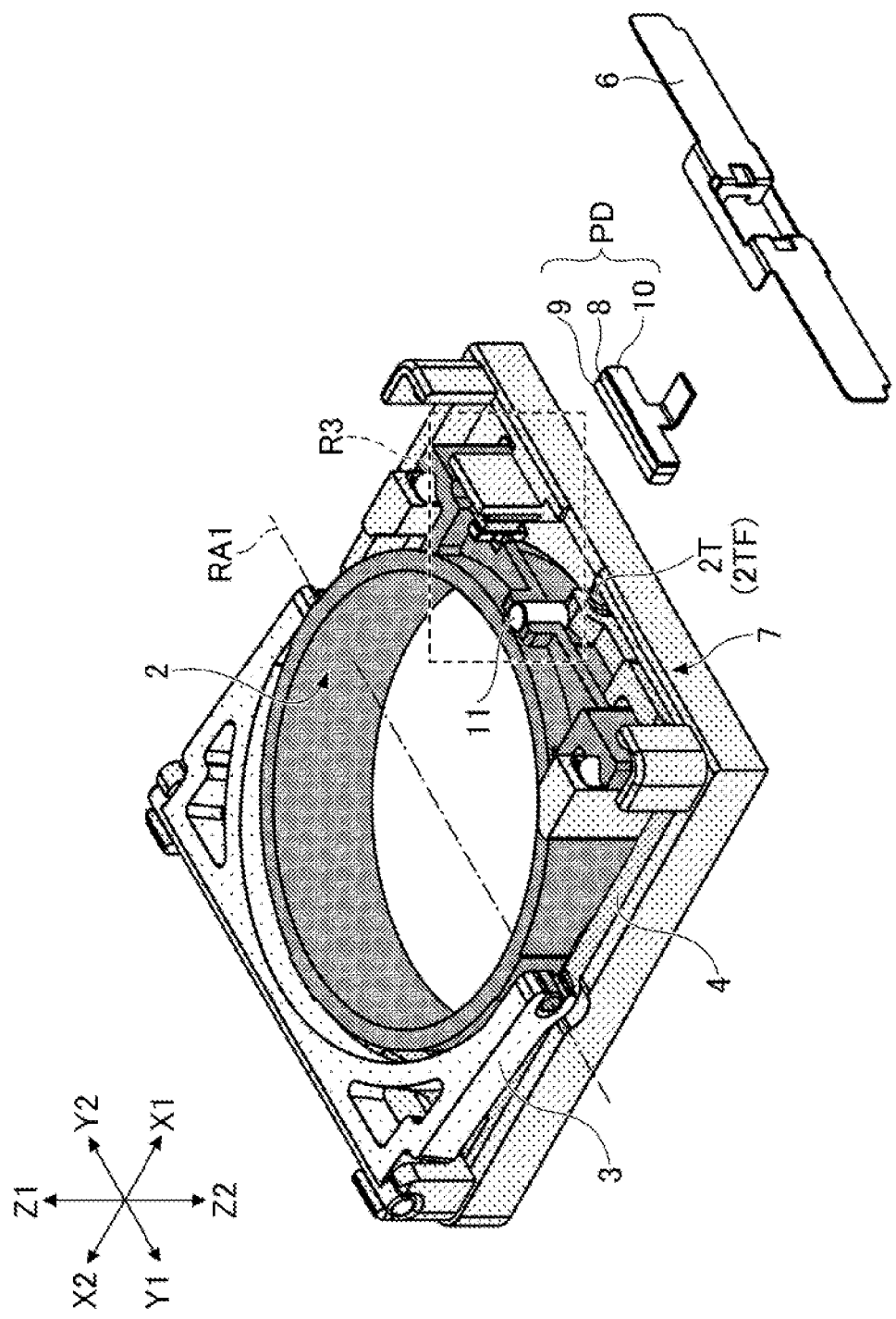
FIG. 11A is a perspective view of the lens driving device, with the cover member being removed.
Figure 11B:
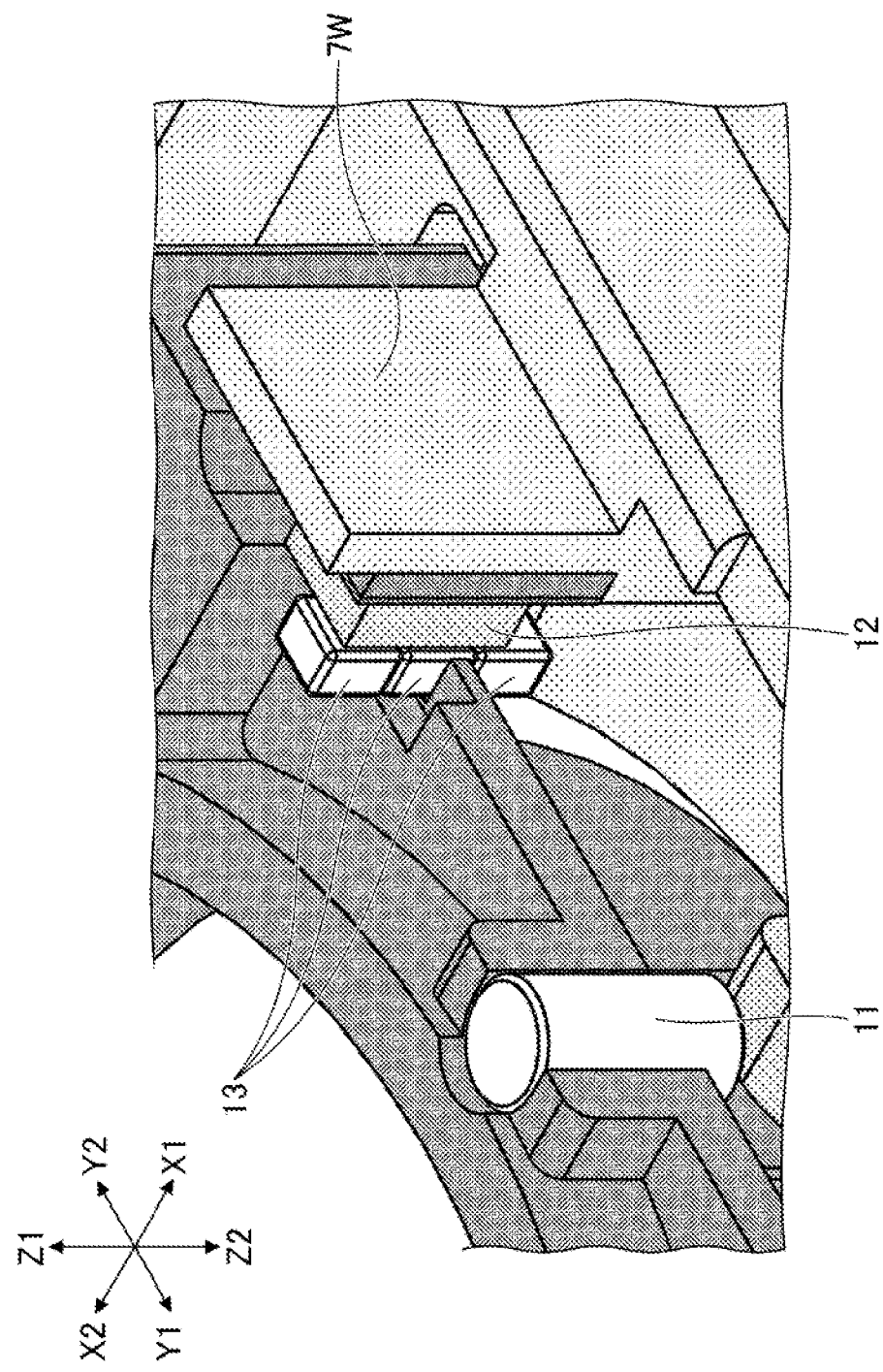
FIG. 11B is a perspective view of a part of the lens driving device, with the cover member being removed.
Figure 12A:
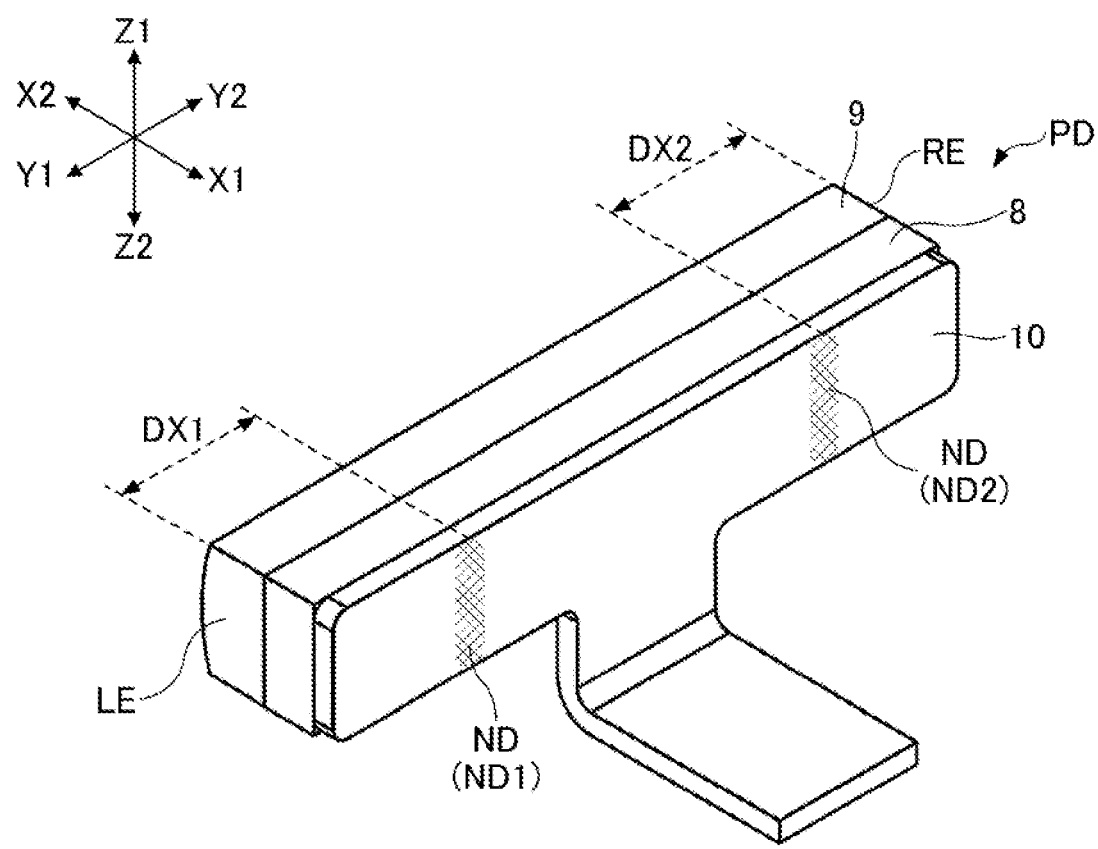
FIG. 12A is a perspective view of the entirety of a piezoelectric driving portion.
Figure 13B:
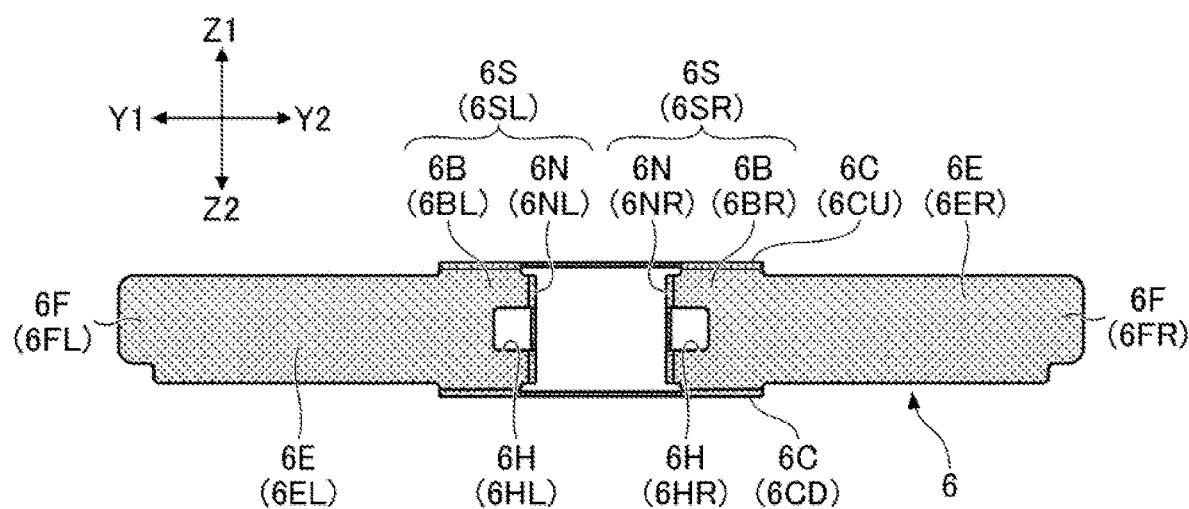
FIG. 13B is a front view of the pressing member.
Figure 13C:
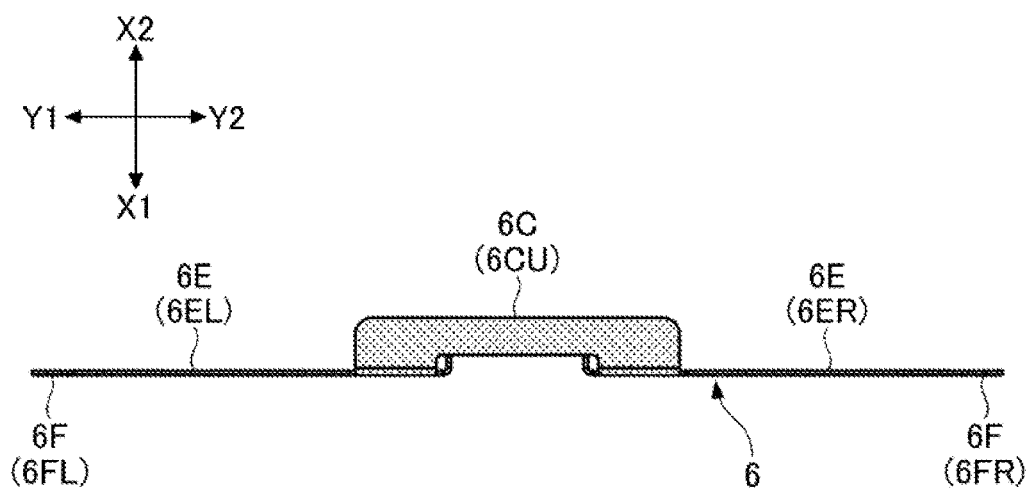
FIG. 13C is a top view of the pressing member.
Figure 13D:
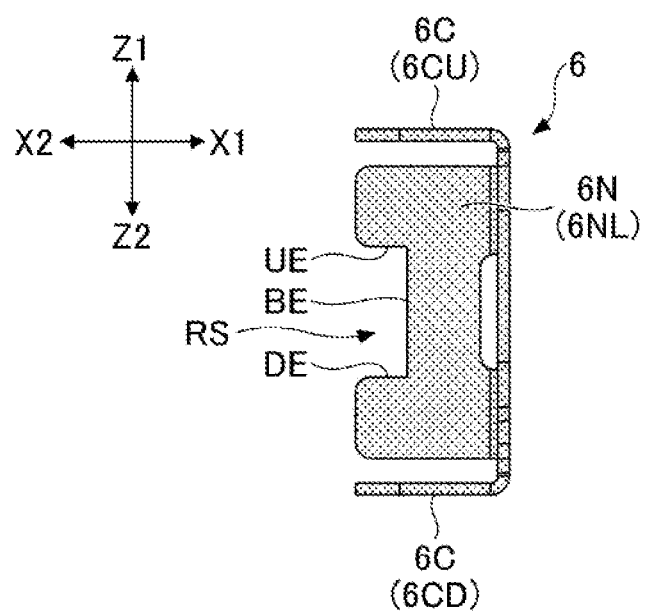
FIG. 13D is a left-hand side view of the pressing member.
Figure 14A:
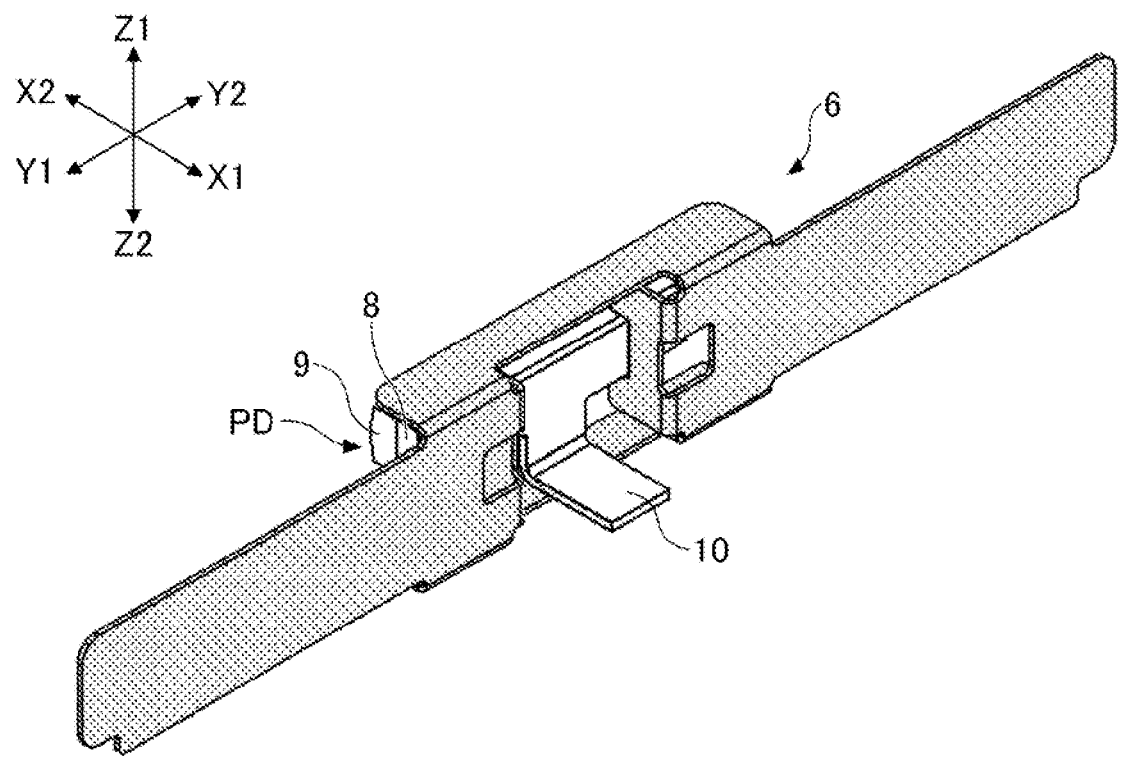
FIG. 14A is a perspective view of the pressing member to which the piezoelectric driving portion is attached.
Figure 14B:
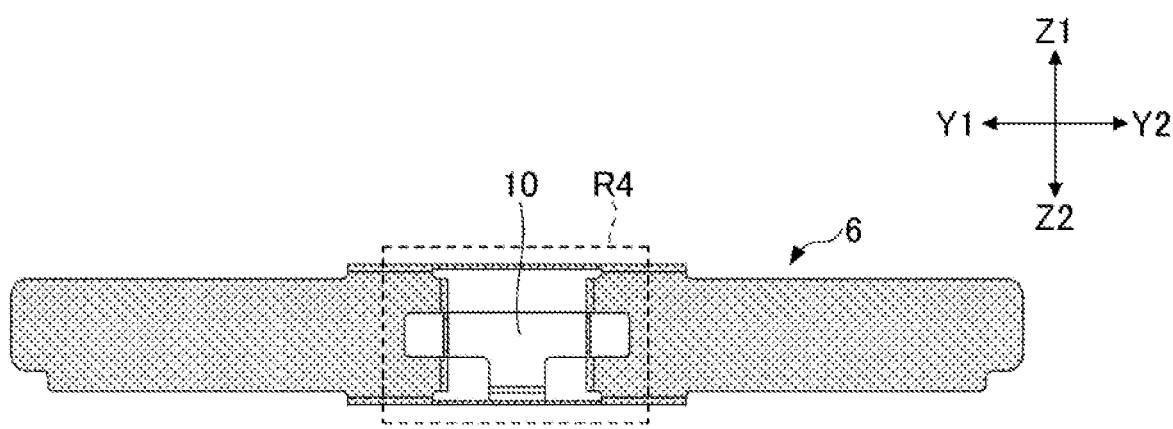
FIG. 14B is a front view of the pressing member to which the piezoelectric driving portion is attached.
Figure 14C:
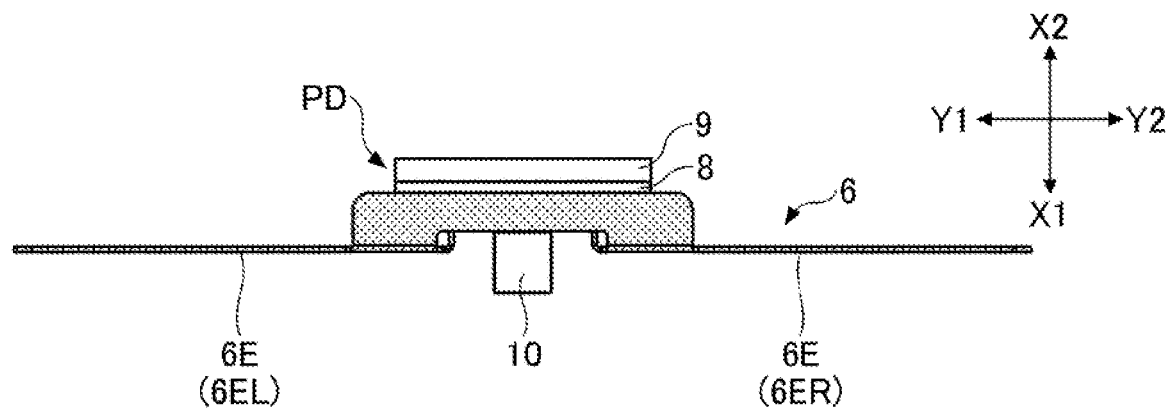
FIG. 14C is a top view of the pressing member to which the piezoelectric driving portion is attached.
Figure 14D:
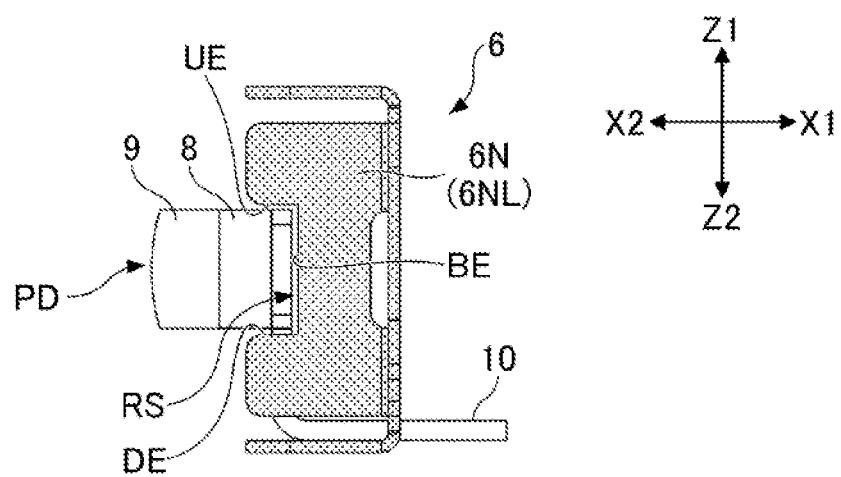
FIG. 14D is a left-hand side view of the pressing member to which the piezoelectric driving portion is attached.
Figure 15B:
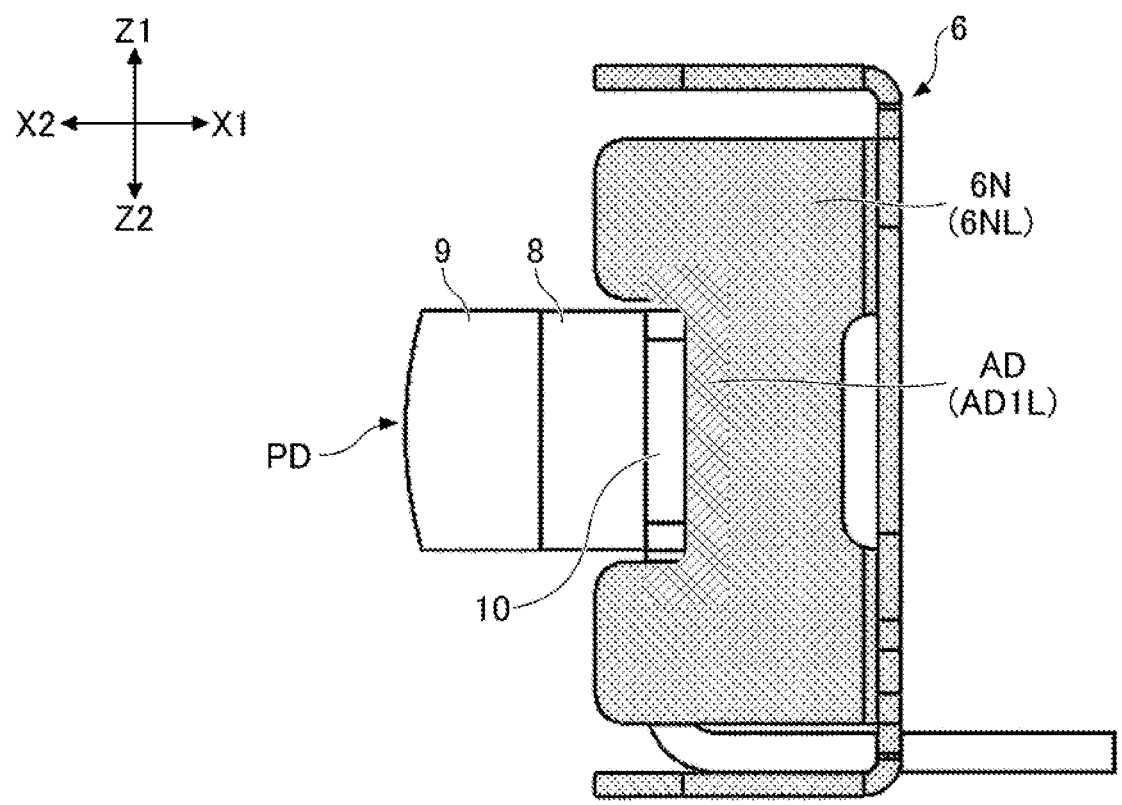
FIG. 15B is a left-hand side view of the pressing member to which the piezoelectric driving portion is attached.
Figure 16A:
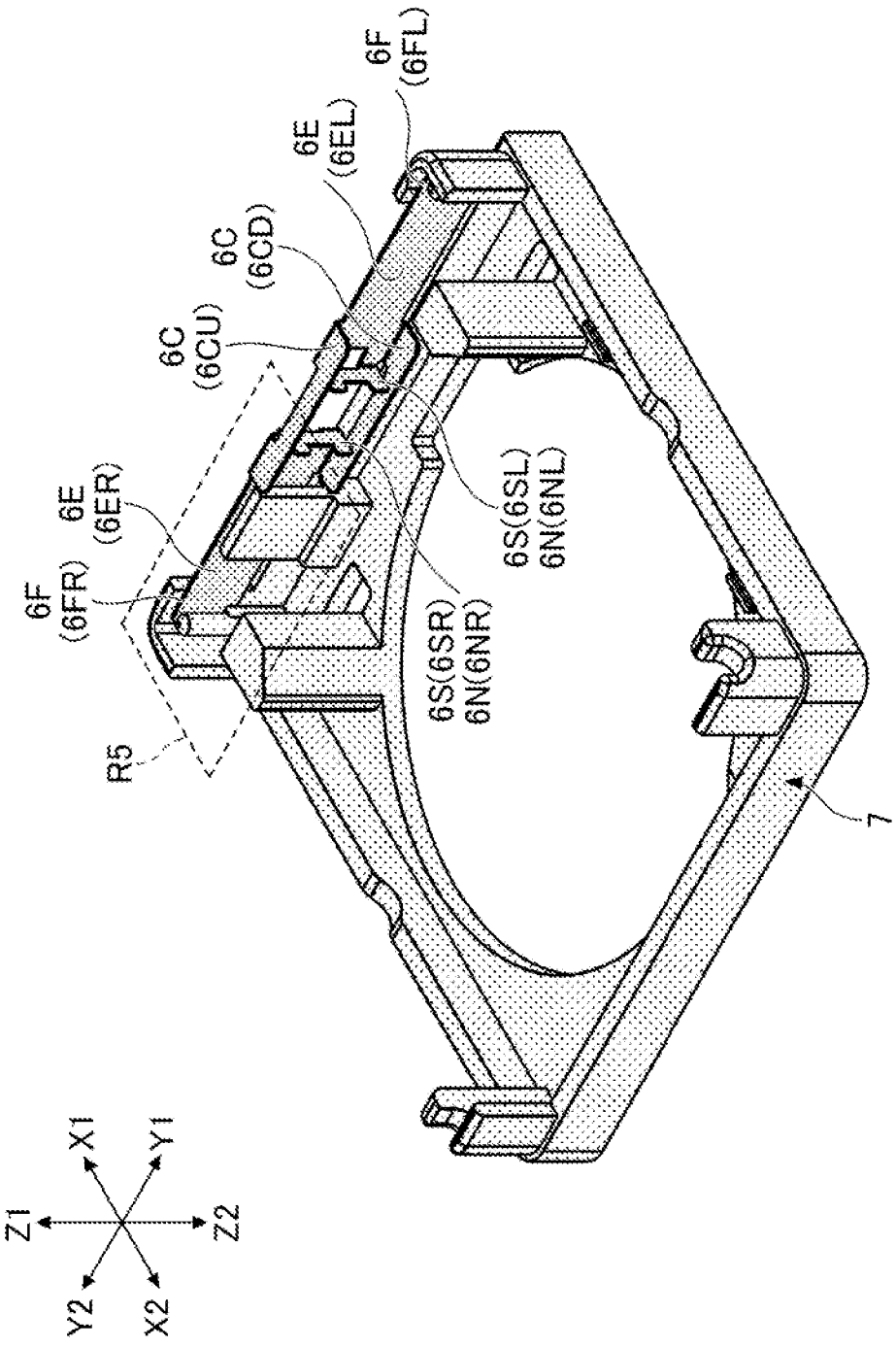
FIG. 16A is a perspective view of the entirety of the base member to which the pressing member is attached.
Figure 16B:
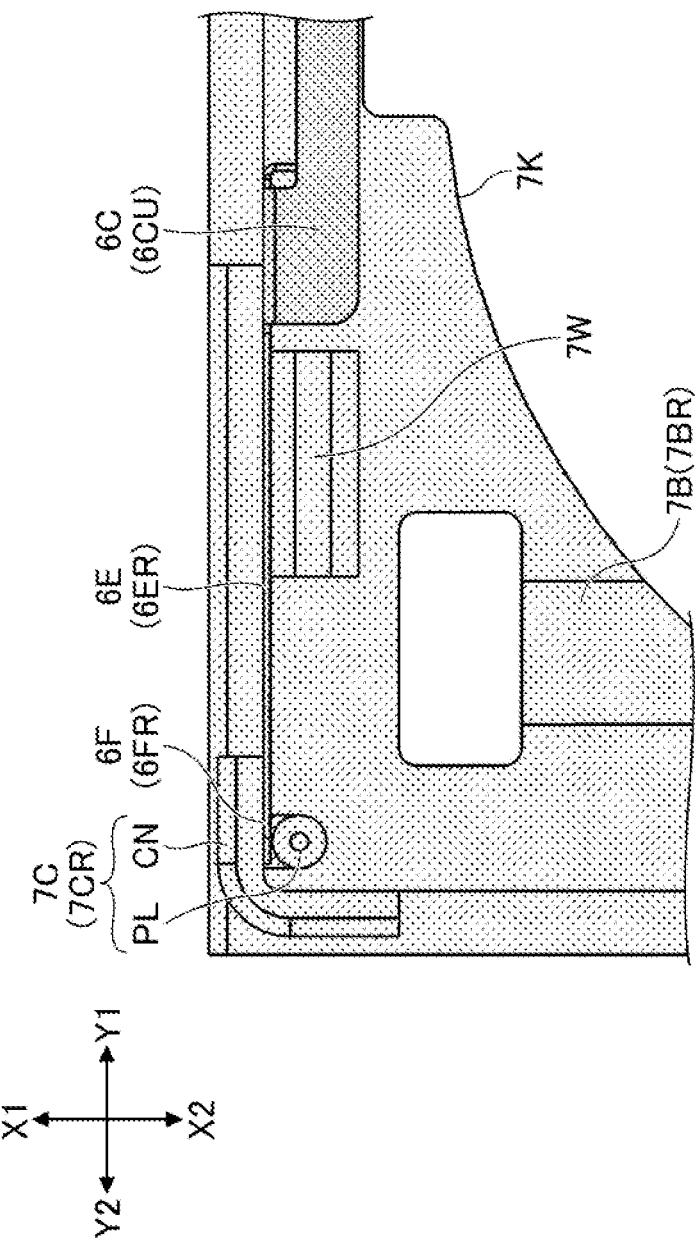
FIG. 16B is a perspective view of a part of the base member to which the pressing member is attached.

Next, referring to FIG. 11A, FIG. 11B, FIG. 12A, FIG. 12B, FIG. 13A to FIG. 13D, FIG. 14A to FIG. 14D, FIG. 15A, FIG. 15B, FIG. 16A, and FIG. 16B, details of the piezoelectric driving portion PD will be described. FIG. 11A and FIG. 11B are perspective views of the lens driving device 101, with the cover member 1 being removed. Specifically, FIG. 11A is a perspective view of the lens driving device 101, with the piezoelectric driving portion PD and the pressing member 6 being further removed. FIG. 11B is an enlarged view of a region R3 surrounded by a dashed line shown in FIG. 11A. FIG. 12A and FIG. 12B are perspective views of the piezoelectric driving portion PD. Specifically, FIG. 12A is a perspective view of the entirety of the piezoelectric driving portion PD, and FIG. 12B is an exploded perspective view of the piezoelectric driving portion PD. FIG. 13A to FIG. 13D are detailed views of the pressing member 6. Specifically, FIG. 13A is a perspective view of the pressing member 6, FIG. 13B is a front view of the pressing member 6, FIG. 13C is a top view of the pressing member 6, and FIG. 13D is a left-hand side view of the pressing member 6. FIG. 14A to FIG. 14D are detailed views of the pressing member 6 to which the piezoelectric driving portion PD is attached. FIG. 14A to FIG. 14D correspond to FIG. 13A to FIG. 13D, respectively. Specifically, FIG. 14A is a perspective view of the pressing member 6 to which the piezoelectric driving portion PD is attached, and corresponds to FIG. 13A. FIG. 14B is a front view of the pressing member 6 to which the piezoelectric driving portion PD is attached, and corresponds to FIG. 13B. FIG. 14C is a top view of the pressing member 6 to which the piezoelectric driving portion PD is attached, and corresponds to FIG. 13C. FIG. 14D is a left-hand side view of the pressing member 6 to which the piezoelectric driving portion PD is attached, and corresponds to FIG. 13D. FIG. 15A and FIG. 15B are views of the pressing member 6 to which the piezoelectric driving portion PD is attached with an adhesive AD. Specifically, FIG. 15A is an enlarged view of a region R4 surrounded by a dashed line shown in FIG. 14B. FIG. 15B is a left-hand side view of the pressing member 6 to which the piezoelectric driving portion PD is attached with an adhesive AD, and corresponds to FIG. 13D and FIG. 14D. FIG. 16A and FIG. 16B are views of the base member 7 to which the pressing member 6 is attached. Specifically, FIG. 16A is a perspective view of the entirety of the base member 7 to which the pressing member 6 is attached. FIG. 16B is an enlarged top view of a region R5 surrounded by a dashed line shown in FIG. 16A.

In the present embodiment, the pressing member 6 is formed of a leaf spring member. Specifically, as illustrated in FIG. 13A to FIG. 13D, the pressing member 6 includes: a fixed portion 6F to be fixed to the base member 7; a support portion 6S configured to support the piezoelectric driving portion PD; and an elastically deformable portion 6E that is provided between the fixed portion 6F and the support portion 6S and is elastically deformable.

Specifically, the fixed portion 6F includes a left-hand fixed portion 6FL and a right-hand fixed portion 6FR, and the support portion 6S includes a left-hand support portion 6SL and a right-hand support portion 6SR. The elastically deformable portion 6E includes: a left-hand elastically deformable portion 6EL provided between the left-hand fixed portion 6FL and the left-hand support portion 6SL; and a right-hand elastically deformable portion 6ER provided between the right-hand fixed portion 6FR and the right-hand support portion 6SR.

The support portion 6S includes: a plate-shaped base portion 6B that is continuous with the elastically deformable portion 6E; and a folded portion 6N that is folded from the base portion 6B in an L shape and projects toward the position of the lens-retaining member 2 (X2 side). In the tip end of the folded portion 6N, a recessed portion RS (see FIG. 13D) is formed. The recessed portion RS is a recessed portion that is opened toward the position of the lens-retaining member 2. Specifically, the base portion 6B includes: a left-hand base portion 6BL that is a part of the left-hand support portion 6SL; and a right-hand base portion 6BR that is a part of the right-hand support portion 6SR. Also, the folded portion 6N includes: a left-hand folded portion 6NL that is a part of the left-hand support portion 6SL; and a right-hand folded portion 6NR that is a part of the right-hand support portion 6SR. The recessed portion RS is formed to have the same shape and the same size in each of the tip ends of the left-hand folded portion 6NL and the right-hand folded portion 6NR. As illustrated in FIG. 14D, a part of the piezoelectric driving portion PD is located in the recessed portion RS and is in contact with an inner-edge portion BE of the recessed portion RS. In this state, as illustrated in FIG. 15B, the piezoelectric driving portion PD is fixed to the folded portion 6N with the adhesive AD. Note that, in FIG. 14D, for ease of understanding, it is illustrated as if there were a gap between the folded portion 6N and the piezoelectric driving portion PD (circuit board 10); however, in reality, the folded portion 6N and the piezoelectric driving portion PD (circuit board 10) are in contact with each other.

More specifically, as illustrated in FIG. 14D, the recessed portion RS includes an upper edge portion UE and a lower edge portion DE that face each other via the inner-edge portion BE. The piezoelectric driving portion PD is disposed between the upper edge portion UE and the lower edge portion DE.

As illustrated in FIG. 12A, the position at which the inner-edge portion BE of the recessed portion RS and the piezoelectric driving portion PD contact each other corresponds to a nodal position ND of the piezoelectric driving portion PD that realizes the bending vibration. The nodal position ND includes a first position ND1 and a second position ND2. In FIG. 12A, for ease of understanding, the nodal position ND is given a cross pattern.

The position at which the inner-edge portion BE of the recessed portion RS and the piezoelectric driving portion PD contact each other corresponds to a position at a predetermined distance from the end portion of the piezoelectric driving portion PD. The predetermined distance is, for example, a distance of approximately one quarter the total length of the piezoelectric driving portion PD. In other words, a first position ND1, one position at which the inner-edge portion BE of the recessed portion RS and the piezoelectric driving portion PD contact each other, is located at a distance DX1 from a left-hand end portion LE of the piezoelectric driving portion PD. The distance DX1 is a distance of approximately one quarter the total length of the piezoelectric driving portion PD (the length thereof in the Y-axis direction). Likewise, a second position ND2, the other position at which the inner-edge portion BE of the recessed portion RS and the piezoelectric driving portion PD contact each other, is located at a distance DX2 from a right-hand end portion RE of the piezoelectric driving portion PD. The distance DX2 is a distance of approximately one quarter the total length of the piezoelectric driving portion PD.

As illustrated in FIG. 15A and FIG. 15B, the piezoelectric driving portion PD and the folded portion 6N are fixed with the adhesive AD. In the present embodiment, the adhesive AD is a UV-curable adhesive. However, the adhesive AD may be an adhesive of another type, such as a moisture-curable type or a heat-curable type. The adhesive AD is adhered between one surface of the folded portion 6N and the piezoelectric driving portion PD, and between the other surface of the folded portion 6N and the piezoelectric driving portion PD.

Specifically, as illustrated in FIG. 12A, the adhesive AD is applied to the first position ND1 and the second position ND2 on the front-side (X1-side) surface of the circuit board 10. In other words, the adhesive AD includes the adhesive AD applied to the first position ND1, and the adhesive AD applied to the second position ND2. Then, the pressing member 6 is pressed against the front surface of the circuit board 10 so that the adhesive AD applied to the front surface of the circuit board 10 is spread by the recessed portion RS provided in the tip end of the folded portion 6N.

As a result, as illustrated in FIG. 15A, the adhesive AD applied to the first position ND1 is divided into: an adhesive AD1L adhered between the left-hand face of the left-hand folded portion 6NL and the piezoelectric driving portion PD; and an adhesive AD1R adhered between the right-hand face of the left-hand folded portion 6NL and the piezoelectric driving portion PD. Likewise, the adhesive AD applied to the second position ND2 is divided into: an adhesive AD2L adhered between the left-hand face of the right-hand folded portion 6NR and the piezoelectric driving portion PD; and an adhesive AD2R adhered between the right-hand face of the right-hand folded portion 6NR and the piezoelectric driving portion PD.

As illustrated in FIG. 13A, the two elastically deformable portions 6E extend from the corresponding base portions 6B in directions away from each other. Specifically, the left-hand elastically deformable portion 6EL extends leftward (Y1 direction) from the left-hand base portion 6BL, and the right-hand elastically deformable portion 6ER extends rightward (Y2 direction) from the right-hand base portion 6BR. Also, as illustrated in FIG. 14C, the extending direction of the elastically deformable portion 6E is along the Y-axis direction, which is the extending direction of the piezoelectric element 8.

The fixed portion 6F is provided on an extension of the elastically deformable portion 6E. As illustrated in FIG. 16B, the fixed portion 6F is held by the holding portion 7C provided in the base member 7. Specifically, the holding portion 7C includes: a cylindrical projection PL extending upward (Z1 direction) from the top surface of the base member 7; and an angular wall portion CN formed in an L shape in a plan view at the corner of the base member 7. The fixed portion 6F of the pressing member 6 is fitted, from above, to between the projection PL and the angular wall portion CN, thereby being held between the projection PL and the angular wall portion CN. Note that, the holding of the fixed portion 6F by the holding portion 7C may be achieved with an adhesive or may be reinforced with an adhesive.

In the present embodiment, as illustrated in FIG. 13A and FIG. 13B, an opening 6H is formed in the base portion 6B of the pressing member 6. Specifically, the opening 6H includes: a left-hand opening 6HL formed in the left-hand base portion 6BL of the left-hand support portion 6SL; and a right-hand opening 6HR formed in the right-hand base portion 6BR of the right-hand support portion 6SR. The left-hand opening 6HL is formed so that the connection state between the left-hand folded portion 6NL and the piezoelectric driving portion PD becomes visually recognizable from the front side (X1 side). The connection state therebetween is, for example, whether the adhesive AD1L is appropriately disposed. Likewise, the right-hand opening 6HR is formed so that the connection state between the right-hand folded portion 6NR and the piezoelectric driving portion PD becomes visually recognizable from the front side (X1 side). The connection state therebetween is, for example, whether the adhesive AD2R is appropriately disposed.

The pressing member 6 includes a connecting portion 6C that connects the two base portions 6B with each other. Specifically, as illustrated in FIG. 13A and FIG. 13B, the pressing member 6 includes an upper connecting portion 6CU and a lower connecting portion 6CD that connect the left-hand base portion 6BL and the right-hand base portion 6BR with each other.

Figure 17A:
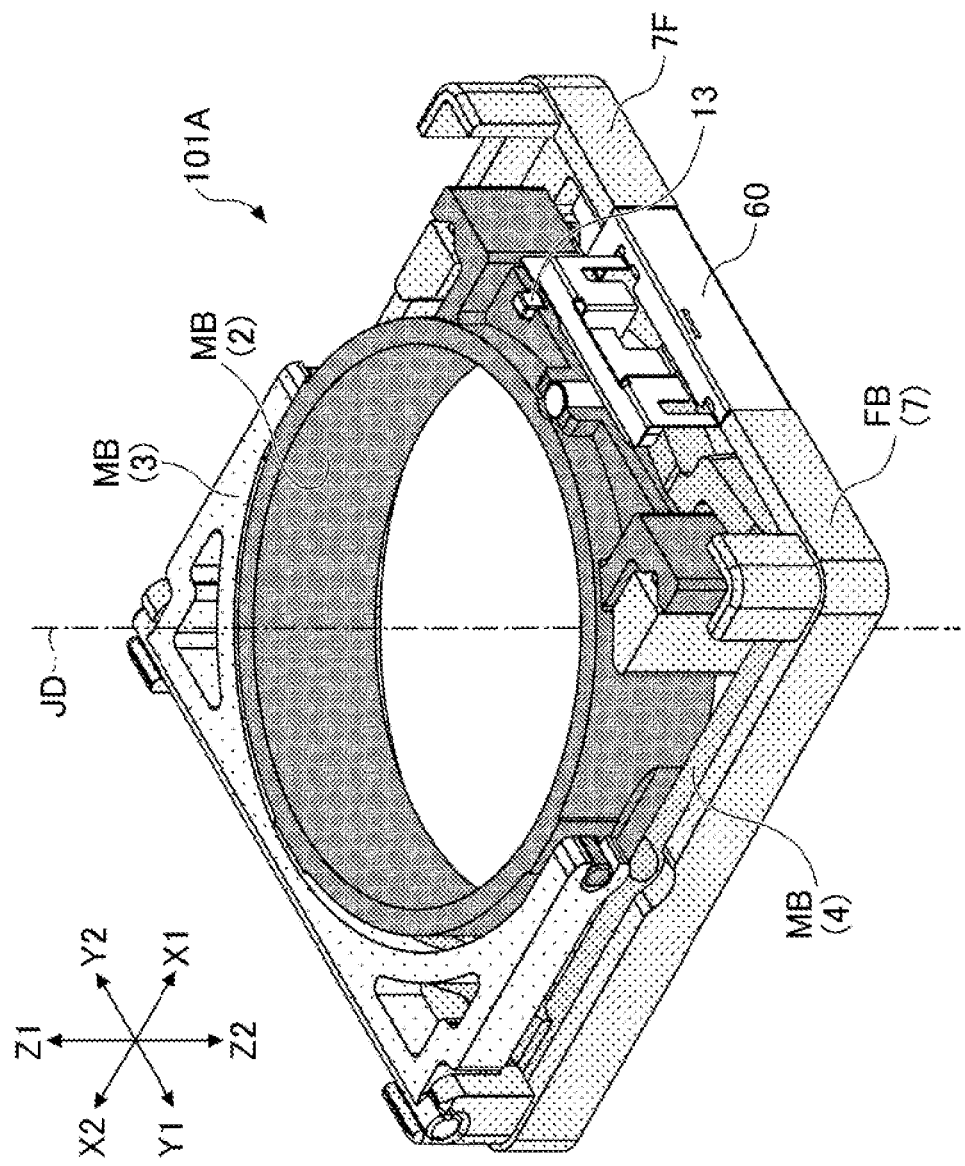
FIG. 17A is a perspective view of another configuration example of the lens driving device, with the cover member being removed.
Figure 17B:
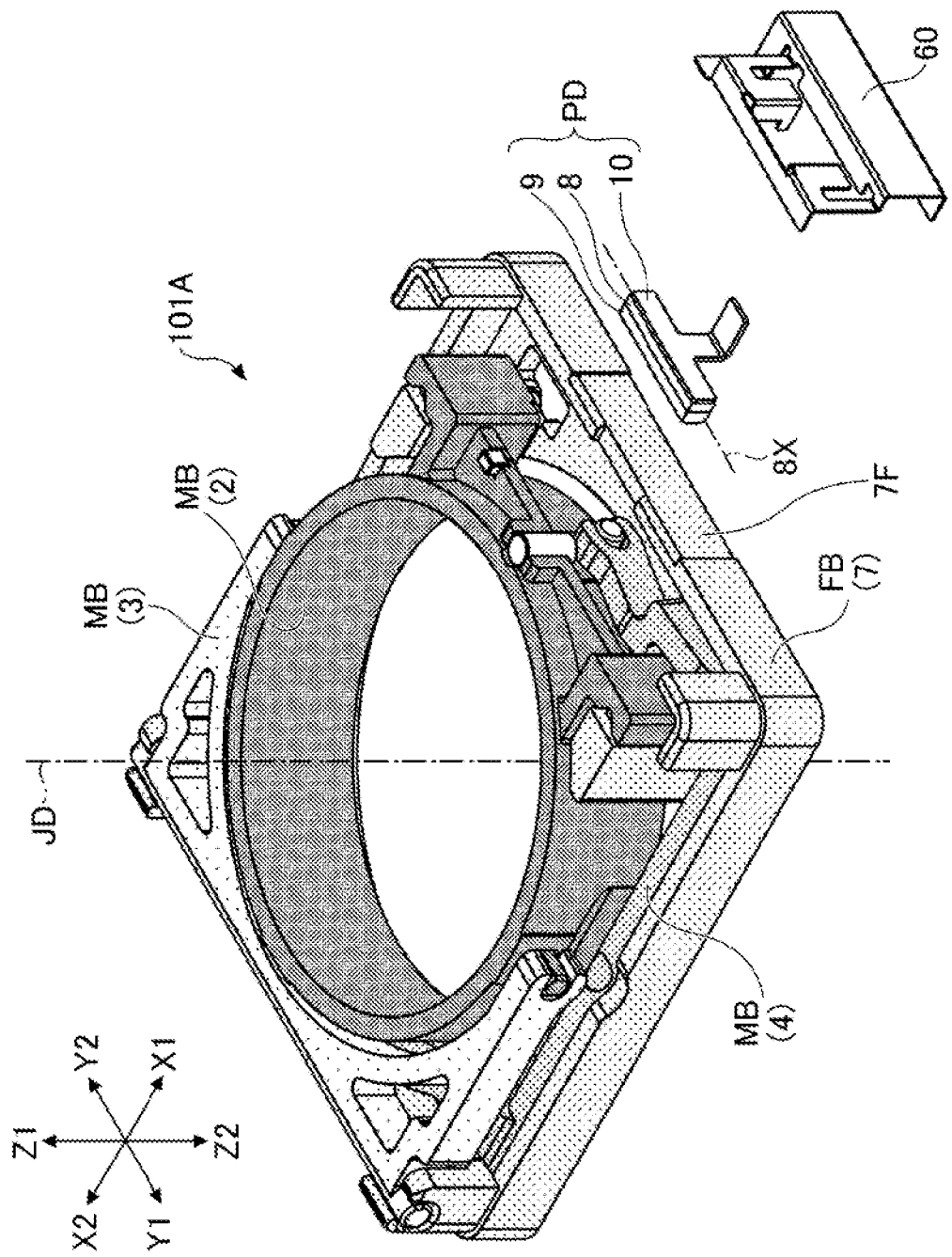
FIG. 17B is a perspective view of the other configuration example of the lens driving device, with some members being further removed.

Next, referring to FIG. 17A, FIG. 17B, and FIG. 18A to FIG. 18D, a lens driving device 101A, another configuration example of the lens driving device 101, will be described. FIG. 17A and FIG. 17B are perspective views of the lens driving device 101A. Specifically, FIG. 17A is a perspective view of the lens driving device 101A, with the cover member 1 being removed, and FIG. 17B is a perspective view of the lens driving device 101A, with the piezoelectric driving portion PD, the pressing member 60, the sensor 12, and the circuit board for the sensor being further removed.

Figure 18A:
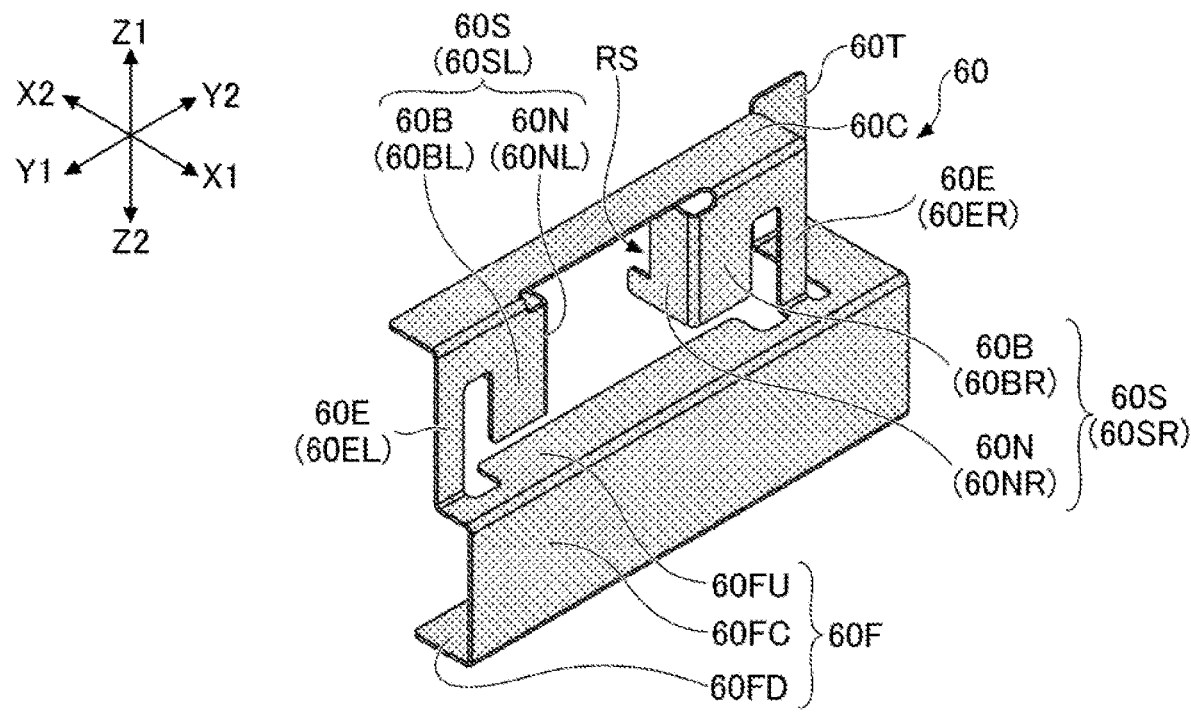
FIG. 18A is a perspective view of another configuration example of the pressing member.
Figure 18B:
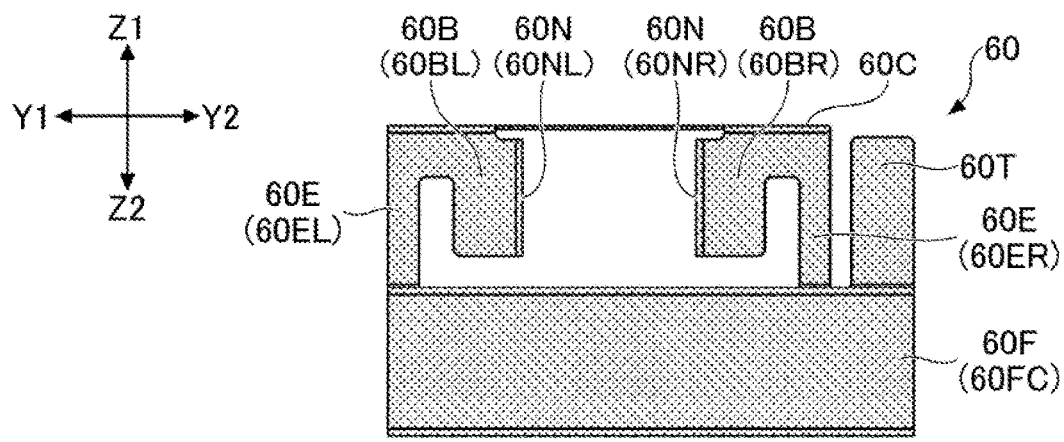
FIG. 18B is a front view of the other configuration example of the pressing member.
Figure 18C:
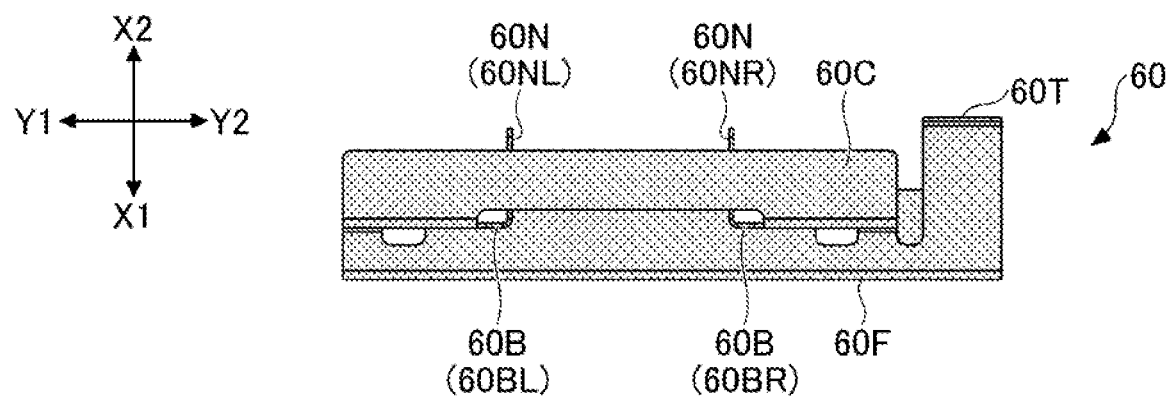
FIG. 18C is a top view of the other configuration example of the pressing member.
Figure 18D:
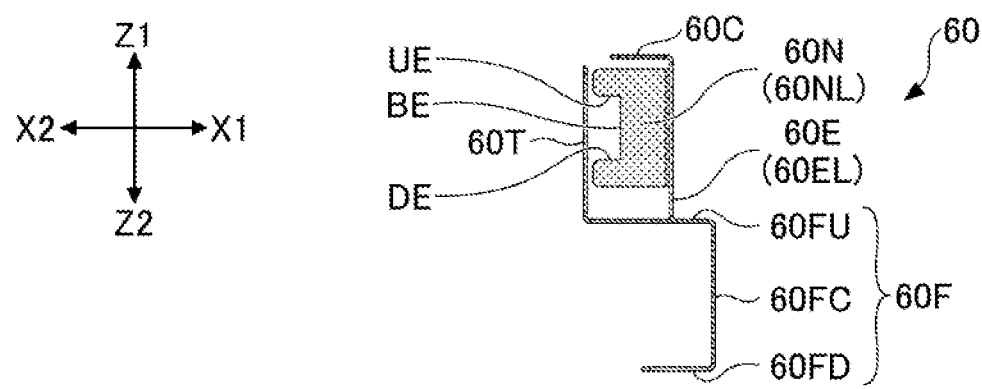
FIG. 18D is a left-hand side view of the other configuration example of the pressing member.

FIG. 18A to FIG. 18D are detailed views of the pressing member 60. Specifically, FIG. 18A is a perspective view of the pressing member 60, FIG. 18B is a front view of the pressing member 60, FIG. 18C is a top view of the pressing member 60, and FIG. 18D is a left-hand side view of the pressing member 60.

The lens driving device 101A is different from the lens driving device 101, mainly in that the bottom end of the pressing member 60 included in the lens driving device 101A is fixed to the base member 7, while both of the left- and right-hand ends of the pressing member 6 included in the lens driving device 101 are fixed to the base member 7. With respect to other aspects, the lens driving device 101A is common to the lens driving device 101. Therefore, in the following, description of the common portions will be omitted, and different portions will be described in detail.

Similar to the pressing member 6, the pressing member 60 is formed of a leaf spring member. In the example as illustrated in FIG. 18A to FIG. 18D, the pressing member 60 includes: a fixed portion 60F to be fixed to the base member 7; a support portion 60S configured to support the piezoelectric driving portion PD; an elastically deformable portion 60E that is provided between the fixed portion 60F and the support portion 60S and is elastically deformable; and a sensor mounting portion 60T to which the sensor 12 is to be attached.

Specifically, the fixed portion 60F includes an upper fixed portion 60FU, a middle fixed portion 60FC, and a lower fixed portion 60FD, and the support portion 60S includes a left-hand support portion 60SL and a right-hand support portion 60SR. The elastically deformable portion 60E includes: a left-hand elastically deformable portion 60EL provided between the upper fixed portion 60FU and the left-hand support portion 60SL; and a right-hand elastically deformable portion 60ER provided between the upper fixed portion 60FU and the right-hand support portion 60SR.

The support portion 60S includes: a plate-shaped base portion 60B that is continuous with the elastically deformable portion 60E; and a folded portion 60N that is folded from the base portion 60B in an L shape and projects toward the position of the lens-retaining member 2 (X2 side). In the tip end of the folded portion 60N, the recessed portion RS is formed. Specifically, the base portion 60B includes: a left-hand base portion 60BL that is a part of the left-hand support portion 60SL; and a right-hand base portion 60BR that is a part of the right-hand support portion 60SR. Also, the folded portion 60N includes: a left-hand folded portion 60NL that is a part of the left-hand support portion 60SL; and a right-hand folded portion 60NR that is a part of the right-hand support portion 60SR. The recessed portion RS is formed to have the same shape and the same size in each of the tip ends of the left-hand folded portion 60NL and the right-hand folded portion 60NR. Similar to the piezoelectric driving portion PD in the lens driving device 101 as illustrated in FIG. 14D, a part of the piezoelectric driving portion PD is located in the recessed portion RS and is in contact with the inner-edge portion BE of the recessed portion RS. In this state, the piezoelectric driving portion PD is fixed to the folded portion 60N with an adhesive.

As illustrated in FIG. 18D, the recessed portion RS includes an upper edge portion UE and a lower edge portion DE that face each other via the inner-edge portion BE. The piezoelectric driving portion PD is disposed between the upper edge portion UE and the lower edge portion DE.

Similar to the case of the piezoelectric driving portion PD in the lens driving device 101 as illustrated in FIG. 12A, the position at which the inner-edge portion BE of the recessed portion RS and the piezoelectric driving portion PD contact each other corresponds to a nodal position ND of the piezoelectric driving portion PD that performs the bending vibration. The nodal position ND includes a first position ND1 and a second position ND2.

The piezoelectric driving portion PD and the folded portion 60N are fixed with an adhesive. The adhesive is, for example, a UV-curable adhesive. The adhesive is applied so as to be adhered between one surface of the folded portion 60N and the piezoelectric driving portion PD, and between the other surface of the folded portion 60N and the piezoelectric driving portion PD. Then, the pressing member 60 is pressed against the front surface of the circuit board 10 so that the adhesive applied to the front surface of the circuit board 10 is spread by the recessed portion RS provided in the tip end of the folded portion 60N.

As illustrated in FIG. 18A, the two elastically deformable portions 60E extend downward (Z2 direction) from the corresponding base portions 60B. In this example, the extending direction of the elastically deformable portion 60E is a perpendicular direction to the extending direction of the piezoelectric element 8 (parallel direction to the rotation axis 8X as illustrated in FIG. 17B).

The fixed portion 60F is provided on an extension of the elastically deformable portion 60E. As illustrated in FIG. 17A and FIG. 17B, the fixed portion 60F is disposed so as to hold a front-side (X1-side) portion of a rectangular frame portion 7F of the base member 7. Specifically, the fixed portion 60F is disposed such that the upper fixed portion 60FU contacts the top face of the rectangular frame portion 7F, the middle fixed portion 60FC contacts the front face of the rectangular frame portion 7F, and the lower fixed portion 60FD contacts the bottom face of the rectangular frame portion 7F. Note that, the holding of the rectangular frame portion 7F by the fixed portion 60F may be achieved with an adhesive or may be reinforced with an adhesive.

The pressing member 60 includes a connecting portion 60C that connects the two base portions 60B with each other. Specifically, as illustrated in FIG. 18A, the connecting portion 60C extends in parallel to the Y-axis direction, and is configured to connect the top end of the left-hand base portion 60BL and the top end of the right-hand base portion 60BR with each other.

The sensor mounting portion 60T is configured so that the sensor 12 (not illustrated) can be attached to the sensor mounting portion 60T. In this example, the sensor mounting portion 60T is formed so as to extend from the upper fixed portion 60FU in the X2 direction and then extend in the Z1 direction. Specifically, the sensor mounting portion 60T is configured so that the sensor 12 to be attached to the sensor mounting portion 60T can face the magnet 13 attached to the lens-retaining member 2. Note that, the sensor 12 is attached to the back surface (X2-oriented surface) of the sensor mounting portion 60T, with an unillustrated circuit board for a sensor being held between the front surface (X1-oriented surface) of the sensor 12 and the back surface (X2-oriented surface) of the sensor mounting portion 60T.

As described above, the lens driving device 101 according to the embodiments of the present invention includes: the fixed member FB; the lens-retaining member 2 configured to retain a lens body; the guide mechanism GM configured to guide the lens-retaining member 2 so as to be movable relative to the fixed member FB in the optical-axis direction; the piezoelectric driving portion PD including the piezoelectric element 8 extending in a direction crossing the optical-axis direction and being configured to move the lens-retaining member 2 in the optical-axis direction; and the pressing member 6 configured to press the piezoelectric driving portion PD against the lens-retaining member 2. The lens-retaining member 2 is configured to be driven by the piezoelectric element 8 that is vibrating.

The pressing member 6 is formed of the leaf spring member and, as illustrated in FIG. 13A, includes: the fixed portion 6F to be fixed to the fixed member FB; the support portion 6S configured to support the piezoelectric driving portion PD; and the elastically deformable portion 6E that is provided between the fixed portion 6F and the support portion 6S and is elastically deformable. The support portion 6S includes: the plate-shaped base portion 6B that is continuous with the elastically deformable portion 6E; and the folded portion 6N that is folded from the base portion 6B in an L shape and projects toward the back side (X2 side) of the lens-retaining member 2; i.e., the lens-retaining member 2 side. The piezoelectric driving portion PD is, as illustrated in FIG. 14D, fixed to the folded portion 6N.

With this configuration, the lens driving device 101 can retain and press the piezoelectric driving portion PD by the pressing member 6 having a simple structure.

In the tip end of the folded portion 6N, the recessed portion RS may be formed. In the lens driving device 101, the recessed portion RS includes, as illustrated in FIG. 14D, the inner-edge portion BE, and the upper edge portion UE (first edge portion) and the lower edge portion DE (second edge portion) that face each other via the inner-edge portion BE. A part of the piezoelectric driving portion PD is located in the recessed portion RS and is disposed between the upper edge portion UE and the lower edge portion DE. The piezoelectric driving portion PD is fixed to the folded portion 6N, with the piezoelectric driving portion PD being in contact with the inner-edge portion BE of the recessed portion RS.

With this configuration, the lens driving device 101 can define the position of the piezoelectric driving portion PD by the pressing member 6 having a simple structure.

In the lens driving device 101, as illustrated in FIG. 12A, the position at which the folded portion 6N (the inner-edge portion BE of the recessed portion RS) and the piezoelectric driving portion PD contact each other corresponds to a nodal position ND of the piezoelectric driving portion PD (the piezoelectric element 8). For example, in the lens driving device 101, the position at which the folded portion 6N (the inner-edge portion BE of the recessed portion RS) and the piezoelectric driving portion PD contact each other corresponds to a position at a predetermined distance from the end portion of the piezoelectric driving portion PD. The predetermined distance is, for example, a distance of approximately one quarter the total length of the piezoelectric driving portion PD.

With this configuration, the lens driving device 101 can support the nodal position ND of the piezoelectric driving portion PD with the edge portion of the folded portion 6N of the pressing member 6. Thus, it is possible to suppress undesirable inhibition of the vibration of the piezoelectric driving portion PD.

In the lens driving device 101, as illustrated in FIG. 15A and FIG. 15B, the piezoelectric driving portion PD and the folded portion 6N are fixed with the adhesive AD. The adhesive AD is adhered between one surface of the folded portion 6N and the piezoelectric driving portion PD, and between the other surface of the folded portion 6N and the piezoelectric driving portion PD. In the example as illustrated in FIG. 15A, the adhesive AD includes: the adhesive AD1L adhered between the left-hand (Y1-side) face of the left-hand folded portion 6NL and the front-side (X1-side) face of the circuit board 10; the adhesive AD1R adhered between the right-hand (Y2-side) face of the left-hand folded portion 6NL and the front-side (X1-side) face of the circuit board 10; the adhesive AD2L adhered between the left-hand (Y1-side) face of the right-hand folded portion 6NR and the front-side (X1-side) face of the circuit board 10; and the adhesive AD2R adhered between the right-hand (Y2-side) face of the right-hand folded portion 6NR and the front-side (X1-side) face of the circuit board 10. Also, the adhesive AD is, as illustrated in FIG. 15B, applied to between the upper (Z1-side) face of the circuit board 10 and the folded portion 6N, and between the lower (Z2-side) face of the circuit board 10 and the folded portion 6N. This configuration can enhance adhesion strength between the piezoelectric driving portion PD and the pressing member 6.

In the lens driving device 101, the two elastically deformable portions 6E extend from the corresponding base portions 6B in directions away from each other. The extending direction of the elastically deformable portion 6E is along the extending direction of the piezoelectric element 8.

This configuration can reduce the dimension of the lens driving device 101 in the optical-axis direction, as compared with a configuration in which the extending direction of the elastically deformable portion 6E is not along the extending direction of the piezoelectric element 8. Also, this configuration produces the effect of being able to make longer the length over which the elastically deformable portion 6E extends, as compared with a configuration in which the extending direction of the elastically deformable portion 6E is not along the extending direction of the piezoelectric element 8. Therefore, this configuration produces the effect of being able to enhance the degree of freedom in design of the leaf spring.

In the lens driving device 101, as illustrated in FIG. 16A and FIG. 16B, the fixed portion 6F is provided on an extension of the elastically deformable portion 6E. The fixed portion 6F is held by the holding portion 7C provided in the base member 7 that is the fixed member FB.

This configuration produces the effect of being able to keep approximately constant the pressing force brought by the pressing member 6 to press the piezoelectric driving portion PD against the lens-retaining member 2, regardless of the position of the lens-retaining member 2 in the optical-axis direction. Therefore, this configuration produces the effect of being able to simplify control of a driving force brought by the piezoelectric driving portion PD that is necessary for moving the lens-retaining member 2 along the optical-axis direction by a predetermined distance. This is advantageous for the following reason. Specifically, when the pressing force brought by the pressing member 6 changes in accordance with changes in the position of the lens-retaining member 2 in the optical-axis direction, the driving force brought by the piezoelectric driving portion PD that is necessary for moving the lens-retaining member 2 along the optical-axis direction by only the predetermined distance changes also.

In the lens driving device 101, as illustrated in FIG. 13A, the opening 6H is formed in the base portion 6B. The opening 6H is formed so that the connection state between the folded portion 6N and the piezoelectric driving portion PD becomes visually recognizable from the front side (X1 side). Note that, as illustrated in FIG. 13A, the opening 6H may be extended to a part of the folded portion 6N.

This configuration produces the effect of being able to apply the adhesive AD to the piezoelectric driving portion PD through the opening 6H. Also, this configuration produces the effect of being able to perform irradiation of UV rays through the opening 6H. The UV rays are irradiated for curing the UV-curable adhesive AD.

In the lens driving device 101, the pressing member 6 includes, as illustrated in FIG. 13A, the upper connecting portion 6CU and the lower connecting portion 6CD that connect the two base portions 6B with each other. This configuration produces the effect of being able to enhance strength of the support portion 6S of the pressing member 6.

In the lens driving device 101, as illustrated in FIG. 11A, the lens-retaining member 2 includes the receiving member 11 formed of metal, and the piezoelectric driving portion PD includes the contact member 9 formed of metal. The lens driving device 101 is configured such that the receiving member 11 and the contact member 9 contact each other. Note that, the contact member 9 and the receiving member 11 may be subjected to a treatment for enhancing wear resistance, such as a heat treatment.

This configuration produces the effect of being able to avoid direct contact between the lens-retaining member 2 and the piezoelectric driving portion PD, and prevent the lens-retaining member 2 from wearing. Also, this configuration produces the effect of being able to enhance wear resistance of the contact member 9 and the receiving member 11 because the contact member 9 and the receiving member 11 are each formed of metal. Also, this configuration produces the effect of being able to make longer the lifetimes of the contact member 9 and the receiving member 11, and hence make longer the lifetime of the lens driving device 101.

In the lens driving device 101, the guide mechanism GM includes, as illustrated in FIG. 6A, the two guide portions (the left-hand guide portion GML and the right-hand guide portion GMR) that are disposed so as to face each other via the piezoelectric driving portion PD in the Y-axis direction. Each of the left-hand guide portion GML and the right-hand guide portion GMR includes: the movable member-side groove 2G (see FIG. 10A), as a first groove, provided in the lens-retaining member 2; the fixed member-side groove 7G (see FIG. 7A), as a second groove, provided in the base member 7 and facing the movable member-side groove 2G; and the ball 5 disposed between the movable member-side groove 2G and the fixed member-side groove 7G. As illustrated in FIG. 9B, the movable member-side groove 2G is formed so as to extend in the optical-axis direction. As illustrated in FIG. 8B, the fixed member-side groove 7G is divided into the two recessed portions 7V so that the ball 5 does not move in the optical-axis direction. The same applies to the lens driving device 101A. Note that, the guide mechanism GM may be configured such that the fixed member-side groove 7G extends in the optical-axis direction and the movable member-side groove 2G is divided into a plurality of recessed portions. Alternatively, the guide mechanism GM may be configured such that each of the movable member-side groove 2G and the fixed member-side groove 7G extends in the optical-axis direction.

The thus-configured guide mechanism GM can suppress the cylindrical portion 2C of the lens-retaining member 2 from deforming due to the pressing force brought by the pressing member 6. This is because both of the guide mechanism GM and the pressing member 6 are disposed at one side (X1 side) of the lens-retaining member 2. In other words, this is because the cylindrical portion 2C of the lens-retaining member 2 is not sandwiched between the guide mechanism GM and the pressing member 6.

Also, as described above, the movable member-side groove 2G, the fixed member-side groove 7G, or both may be divided into at least two recessed portions. In this case, the ball 5 includes: a first ball to be housed in one of the at least two recessed portions; and a second ball to be housed in another one of the at least two recessed portions.

In the lens driving device 101, as illustrated in FIG. 7A, the left-hand fixed member-side groove 7GL is divided into the left-hand upper recessed portion 7VLU and the left-hand lower recessed portion 7VLD, and the right-hand fixed member-side groove 7GR is divided into the right-hand upper recessed portion 7VRU and the right-hand lower recessed portion 7VRD. As illustrated in FIG. 7B, the ball 5 includes: the left-hand upper ball 5LU to be housed in the left-hand upper recessed portion 7VLU; the left-hand lower ball 5LD to be housed in the left-hand lower recessed portion 7VLD; the right-hand upper ball 5RU to be housed in the right-hand upper recessed portion 7VRU; and the right-hand lower ball 5RD to be housed in the right-hand lower recessed portion 7VRD.

This configuration can prevent narrowing of the interval between the left-hand upper ball 5LU and the left-hand lower ball 5LD that are held between the left-hand movable member-side groove 2GL and the left-hand fixed member-side groove 7GL. Likewise, this configuration can prevent narrowing of the interval between the right-hand upper ball 5RU and the right-hand lower ball 5RD that are held between the right-hand movable member-side groove 2GR and the right-hand fixed member-side groove 7GR. Therefore, this configuration can more reliably suppress the lens-retaining member 2 from tilting when the lens-retaining member 2 moves in the optical-axis direction.

In the above, the embodiments of the present invention have been described in detail. However, the present invention should not be construed as being limited to the above-described embodiments. Various modifications, substitutions, or the like are applicable to the above-described embodiments without departing from the scope of claims recited. Also, the features described with reference to the above-described embodiments may be appropriately combined with each other unless there is any contradiction from the technical viewpoint.

For example, in the above-described embodiments, the lens-retaining member 2 is configured so as to include pivots (the first pivot 2S and the second pivot 2T) and exclude a pivotally support portion. However, the lens-retaining member 2 may be configured so as to include a pivotally support portion. In this case, the first link member 3 may be configured so as to include a pivot corresponding to that pivotally support portion. The same applies to the second link member 4.

Also, in the above-described embodiments, the base member 7 is configured so as to include pivotally support portions (the third pivotally support portion 7H and the fourth pivotally support portion 7J) and exclude a pivot. However, the base member 7 may be configured to include a pivot. In this case, the first link member 3 may be configured so as to include a pivotally support portion corresponding to that pivot. The same applies to the second link member 4.

Also, in the above-described embodiments, the first pivot 2S is configured so as to include the left-hand first pivot 2SL and the right-hand first pivot 2SR; i.e., a pair of pivots. However, the first pivot 2S may be configured with a combination of a pivot and a pivotally support portion. For example, the first pivot 2S may be configured so as to include the left-hand first pivot 2SL and a right-hand first pivotally support portion (not illustrated). In this case, the first pivotally support portion 3H may be configured so as to include the left-hand first pivotally support portion 3HL and a right-hand first pivot (not illustrated). The same applies to the second pivot 2T, the second pivotally support portion 4H, the third pivot 3S, the third pivotally support portion 7H, the fourth pivot 4S, and the fourth pivotally support portion 7J.

Also, the number of the balls 5 disposed as one set between the movable member-side groove 2G and the fixed member-side groove 7G may be three or more or may be one.

The above-described lens driving device is able to press the piezoelectric element against the lens-retaining member using a simpler structure.

What is claimed is:

1. A lens driving device, comprising:
a fixed member;
a lens-retaining member configured to retain a lens body;
a guide mechanism configured to guide the lens-retaining member so as to be movable relative to the fixed member in an optical-axis direction;
a piezoelectric driving portion that includes a piezoelectric element extending in a direction crossing the optical-axis direction, and is configured to move the lens-retaining member in the optical-axis direction; and
a pressing member configured to press the piezoelectric driving portion against the lens-retaining member,
the pressing member being formed of a leaf spring member, and including
a fixed portion to be fixed to the fixed member,
a support portion configured to support the piezoelectric driving portion, and
an elastically deformable portion that is provided between the fixed portion and the support portion and is elastically deformable,
the support portion including
a plate-shaped base portion that is continuous with the elastically deformable portion, and
a folded portion that is folded from the plate-shaped base portion in an L shape and projects toward the lens-retaining member, and
the piezoelectric driving portion being fixed to the folded portion.

2. The lens driving device according to claim 1, wherein:
the folded portion includes a recessed portion in a tip end thereof;
the recessed portion includes an inner-edge portion, a first edge portion, and a second edge portion, the first edge portion and the second edge portion facing each other via the inner-edge portion; and
the piezoelectric driving portion is fixed to the folded portion, with a part of the piezoelectric driving portion being located in the recessed portion, being disposed between the first edge portion and the second edge portion, and being in contact with the inner-edge portion of the recessed portion.

3. The lens driving device according to claim 1, wherein positions at which the folded portion and the piezoelectric driving portion contact each other correspond to positions of nodes of the piezoelectric driving portion that vibrates so as to have two nodes.

4. The lens driving device according to claim 1, wherein:
a position at which the folded portion and the piezoelectric driving portion contact each other corresponds to a position at a predetermined distance from an end portion of the piezoelectric driving portion; and
the predetermined distance is a distance of approximately one quarter a total length of the piezoelectric driving portion.

5. The lens driving device according to claim 1, wherein:
the piezoelectric driving portion and the folded portion are fixed with an adhesive; and
the adhesive is adhered between one surface of the folded portion and the piezoelectric driving portion, and between another surface of the folded portion and the piezoelectric driving portion.

6. The lens driving device according to claim 1, wherein:
the fixed portion includes two fixed portions, the support portion includes two support portions, and the elastically deformable portion includes two elastically deformable portions;
the two elastically deformable portions extend from corresponding base portions in directions away from each other, the corresponding base portions being the plate-shaped base portion; and
an extending direction of the elastically deformable portion is along an extending direction of the piezoelectric element.

7. The lens driving device according to claim 6, wherein:
the two fixed portions are provided as extensions of the two elastically deformable portions; and
the fixed portions are held by holding portions formed in the fixed member.

8. The lens driving device according to claim 6, wherein each of the corresponding base portions has an opening.

9. The lens driving device according to claim 5, wherein the pressing member includes an upper connecting portion and a lower connecting portion that connect two base portions, the two base portions being the plate-shaped base portion.

10. The lens driving device according to claim 1, wherein:
the lens-retaining member includes a receiving member formed of metal;
the piezoelectric driving portion includes a contact member formed of metal; and
the receiving member and the contact member are configured to contact each other.

11. The lens driving device according to claim 1, wherein:
the guide mechanism includes two guide portions that are disposed so as to face each other via the piezoelectric driving portion;
each of the two guide portions includes
a first groove provided in the lens-retaining member,
a second groove provided in the fixed member and facing the first groove, and
a ball disposed between the first groove and the second groove; and
the first groove, the second groove, or both extend in the optical-axis direction.

12. A camera module, comprising:
the lens driving device according to claim 1;
the lens body; and
an image-capturing element facing the lens body.

* * * * *